United States Patent
Hobgood et al.

(10) Patent No.: US 11,818,025 B2
(45) Date of Patent: Nov. 14, 2023

(54) METHODS, SYSTEMS, AND APPARATUS TO GENERATE INFORMATION TRANSMISSION PERFORMANCE ALERTS

(71) Applicant: Oracle International Corporation, Redwood Shores, CA (US)

(72) Inventors: Andrew Wesley Hobgood, White River Junction, VT (US); Seth Jonathan Brown, Hanover, NH (US); James Harold Cowie, Hanover, NH (US)

(73) Assignee: Oracle International Corporation, Redwood Shores, CA (US)

( * ) Notice: Subject to any disclaimer, the term of this patent is extended or adjusted under 35 U.S.C. 154(b) by 127 days.

(21) Appl. No.: 17/502,543

(22) Filed: Oct. 15, 2021

(65) Prior Publication Data
US 2022/0038356 A1    Feb. 3, 2022

Related U.S. Application Data

(63) Continuation of application No. 17/064,878, filed on Oct. 7, 2020, now Pat. No. 11,178,035, which is a
(Continued)

(51) Int. Cl.
*H04L 43/0852* (2022.01)
*H04L 43/10* (2022.01)
(Continued)

(52) U.S. Cl.
CPC .......... *H04L 43/0852* (2013.01); *G06F 11/30* (2013.01); *H04L 43/00* (2013.01);
(Continued)

(58) Field of Classification Search
None
See application file for complete search history.

(56) References Cited

U.S. PATENT DOCUMENTS

| | | |
|---|---|---|
| 7,120,449 B1 | 10/2006 | Muhonen et al. |
| 7,373,415 B1 | 5/2008 | Deshan et al. |
| | (Continued) | |

FOREIGN PATENT DOCUMENTS

| | | |
|---|---|---|
| CN | 1989745 A | 6/2007 |
| CN | 101189895 A | 5/2008 |
| | (Continued) | |

OTHER PUBLICATIONS

Lin et al., "Anomalies detection method of IP forwarding based on behavior", Computer applications, Mar. 2006, vol. 26, No. 3, pp. 53-55 (English abstract submitted).

*Primary Examiner* — Jeffrey R Swearingen
(74) *Attorney, Agent, or Firm* — Invoke

(57) ABSTRACT

An alert system and method are provided to identify and characterize real-time information transmission anomalies in high-frequency global and local traceroute data. The system includes active network sensors and/or collector devices, which collect traceroute data associated with transmissions to different points in a computer network and provide the traceroute data to a master server. The traceroute data is obtained by the active network sensors by sending probing data packets to numerous computing target devices located locally with respect to the target device and/or globally. The master server determines one or more anomalies from the received traceroute data and characterizes the anomaly in terms of type, severity, location, affected Domain Name System (DNS) server and/or Internet Service Provider (ISP).

18 Claims, 14 Drawing Sheets

Related U.S. Application Data continuation of application No. 15/746,594, filed as application No. PCT/US2016/043340 on Jul. 21, 2016, now Pat. No. 10,848,406.

(60) Provisional application No. 62/195,478, filed on Jul. 22, 2015.

(51) Int. Cl.
  *G06F 11/30* (2006.01)
  *H04L 61/4511* (2022.01)
  *H04L 43/00* (2022.01)
  *H04L 41/0677* (2022.01)
  *H04L 43/16* (2022.01)
  *H04L 43/106* (2022.01)

(52) U.S. Cl.
  CPC .......... *H04L 43/10* (2013.01); *H04L 61/4511* (2022.05); *H04L 41/0677* (2013.01); *H04L 43/106* (2013.01); *H04L 43/16* (2013.01)

(56) References Cited

U.S. PATENT DOCUMENTS

| | | |
|---|---|---|
| 8,127,242 B1 | 2/2012 | Su |
| 9,118,680 B1 | 8/2015 | Dunlap et al. |
| 10,425,308 B2 | 9/2019 | Burke et al. |
| 2002/0049838 A1 | 4/2002 | Sylor et al. |
| 2003/0023716 A1 | 1/2003 | Loyd |
| 2003/0061340 A1 | 3/2003 | Sun et al. |
| 2003/0214907 A1* | 11/2003 | Berkcan ............ H02H 7/263 370/232 |
| 2005/0111363 A1* | 5/2005 | Snelgrove ............ H04M 15/51 370/230 |
| 2005/0243733 A1 | 11/2005 | Crawford et al. |
| 2006/0143496 A1 | 6/2006 | Silverman |
| 2006/0285509 A1 | 12/2006 | Asplund |
| 2007/0053284 A1 | 3/2007 | Hu |
| 2007/0250625 A1 | 10/2007 | Titus |
| 2008/0031257 A1 | 2/2008 | He |
| 2009/0198832 A1 | 8/2009 | Shah et al. |
| 2012/0179814 A1 | 7/2012 | Swildens et al. |
| 2014/0109223 A1 | 4/2014 | Jin et al. |
| 2014/0221084 A1 | 8/2014 | Morrison et al. |
| 2016/0112292 A1* | 4/2016 | Ahuja ............ H04L 67/1097 709/212 |
| 2016/0277272 A1* | 9/2016 | Peach ............ H04L 43/0858 |

FOREIGN PATENT DOCUMENTS

| | | |
|---|---|---|
| CN | 101505230 A | 8/2009 |
| CN | 102571480 A | 7/2012 |
| CN | 102999314 A | 3/2013 |
| JP | 2003-060704 A | 2/2003 |
| JP | 2003-536162 A | 12/2003 |
| WO | 01/98916 A1 | 12/2001 |

* cited by examiner

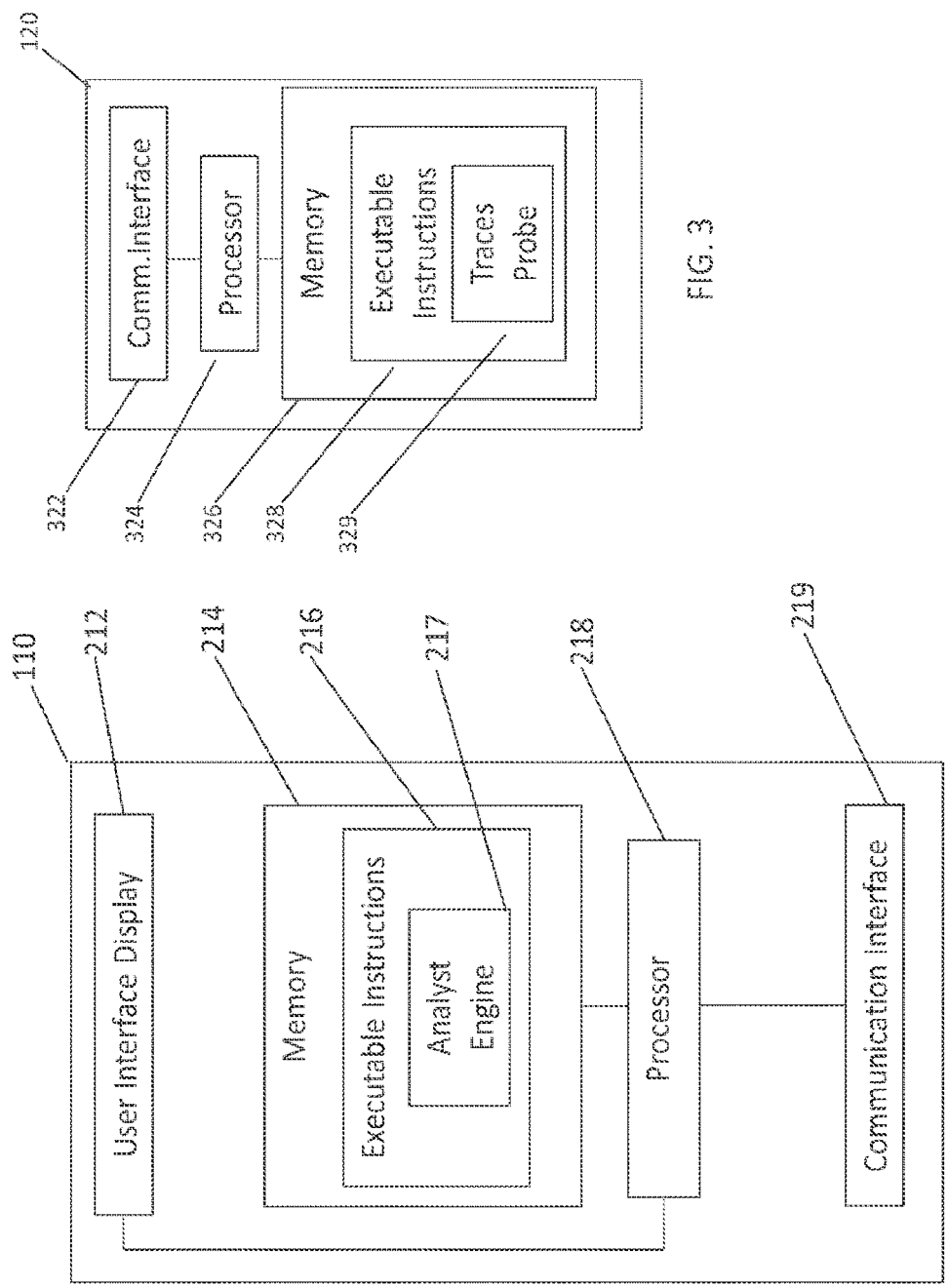

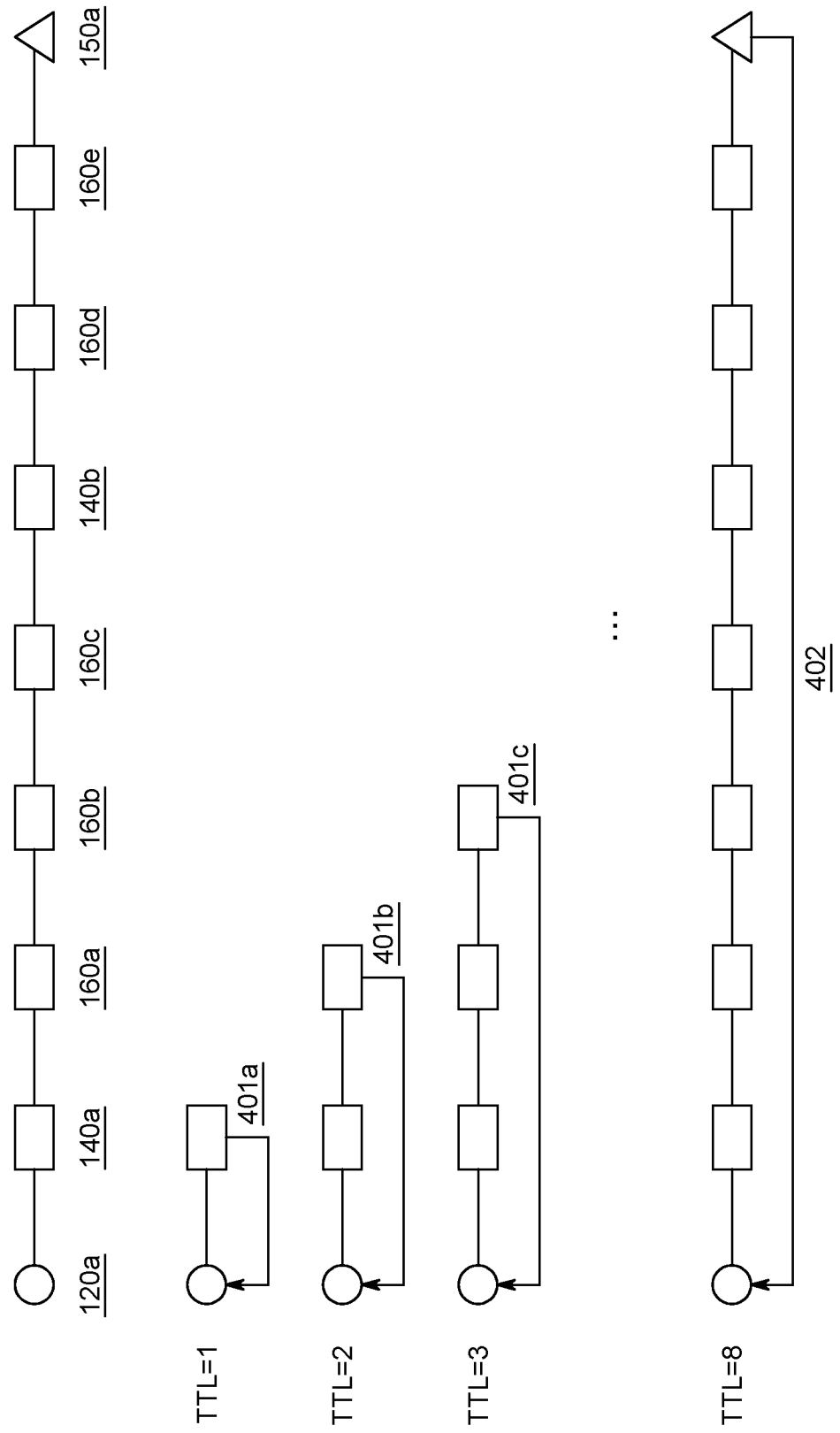

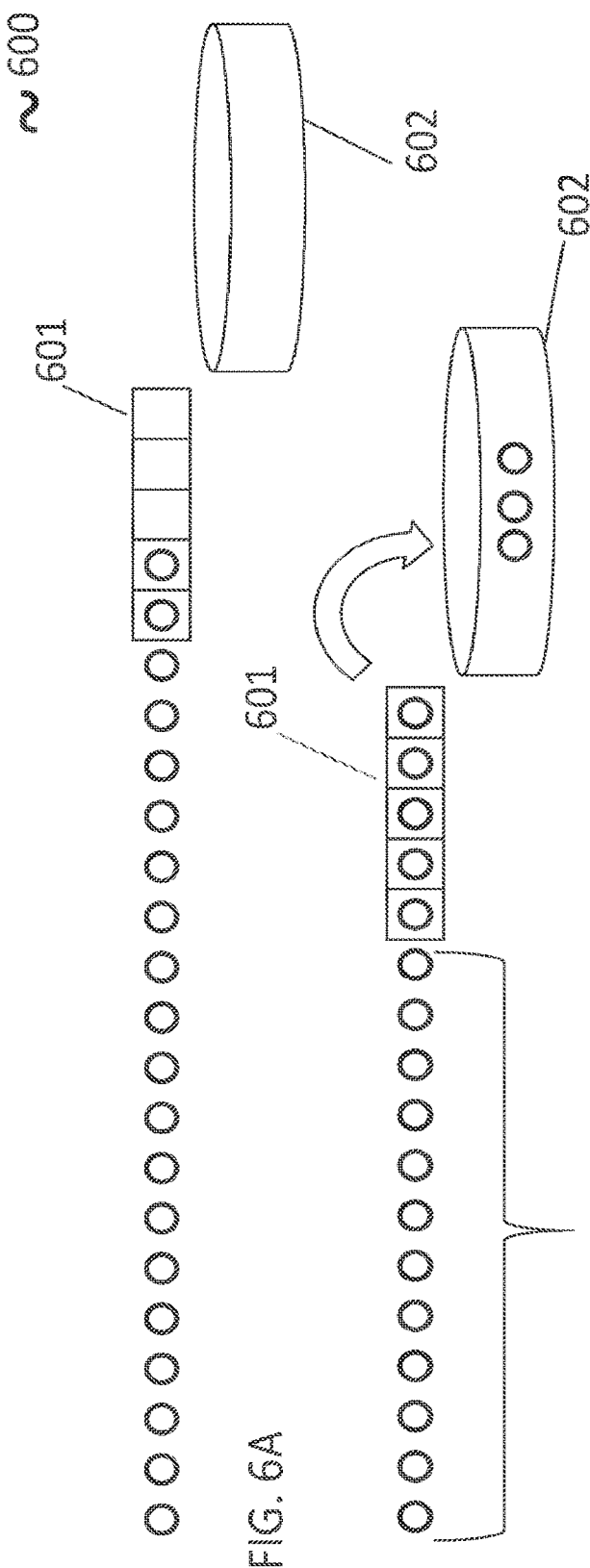
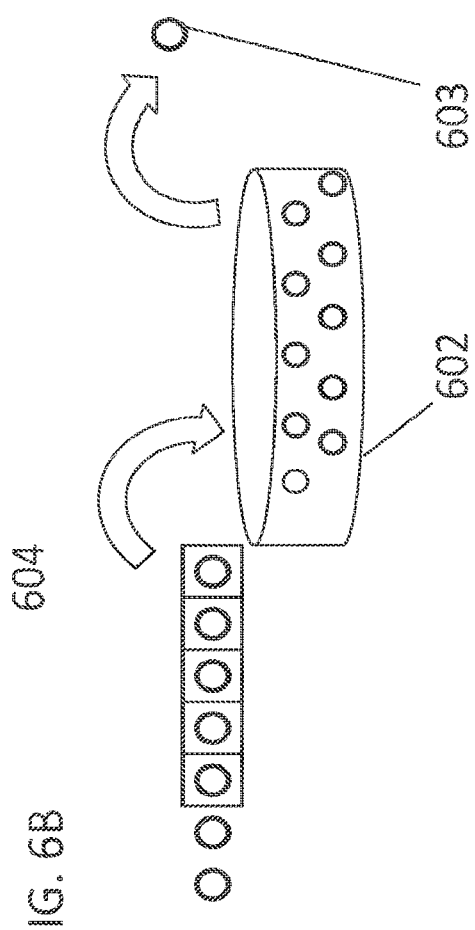
FIG. 6A
FIG. 6B
FIG. 6C

METHODS, SYSTEMS, AND APPARATUS TO GENERATE INFORMATION TRANSMISSION PERFORMANCE ALERTS

INCORPORATION BY REFERENCE; DISCLAIMER

Each of the following applications are hereby incorporated by reference: application Ser. No. 17/064,878, filed on Oct. 7, 2020; application Ser. No. 15/746,594, filed on Jan. 22, 2018; application no. PCT/US2016/043340, filed on Jul. 21, 2016; application No. 62/195,478, filed on Jul. 22, 2015. The Applicant hereby rescinds any disclaimer of claim scope in the parent application(s) or the prosecution history thereof and advises the USPTO that the claims in this application may be broader than any claim in the parent application(s).

BACKGROUND

The internet is a global system of interconnected computer networks that communicate using the Internet Protocol (IP) family of packet-switching protocols. Devices connected to the internet communicate with each other by exchanging packets of information that are addressed to particular IP addresses, which are typically represented as multi-bit numbers. (e.g., 32 bits for IPv4 and 128 bits for IPv6).

Routers, switches, bridges, and other devices forward each packet towards its destination based on the packet's IP address. Some devices, such as routers, can route a packet based on traffic on the different paths to the packet's destination, e.g., to avoid congestion or to balance the traffic load across the available paths. A router may also route a packet based on the type of data carried by the packet. For instance, the router may transmit packets carrying data that is susceptible to latency, such as voice or video data, ahead of other packets to avoid increasing latency unnecessarily.

Each router connected to the internet has one or more IP addresses of its own and forms one of the many nodes on the internet. Because the internet uses packet switching and has many nodes, it can withstand the loss of a critical node due to equipment failure, natural disaster, political events, etc. by dynamically routing traffic around the affected areas. Nevertheless, even the temporary loss of a node can disrupt internet services by reducing connectivity or increasing latency. Disruptions in internet services can make it more expensive for content providers to reliably deliver content to consumers in and possibly beyond the affected area.

SUMMARY

The inventors have appreciated that disruptions in internet services caused by node failures, etc., sometimes result in a deviation from normal network performance patterns. These deviations, also called anomalies, can be detected using traceroute data acquired by a globally distributed traceroute data collector system. If the system detects an anomaly, it may issue a performance alert about the anomaly. In some cases, the system may characterize the anomaly and determine the presence, location, and/or type of the internet service disruption responsible for causing the anomaly based on the anomaly's characteristics.

In some implementations, a master server receives traceroute data from a first network sensor or traceroute data collector indicating transmission latency between the network sensor and a target computing device. The master server can identify an anomaly indication by determining if the difference between an expected latency and a current latency with respect to the target computing device is significant and/or beyond a predefined threshold. Similarly, the master server can receive traceroute data packets sent by a second network sensor or traceroute data collector. The master server can identify an anomaly indication by determining if the difference between an expected latency and a current latency with respect to the target computing device is significant and/or beyond a predefined threshold.

The master server can utilize one or more anomaly indications derived from the data collected from traceroute data collectors to calculate a coherency value or confidence value and further make a network performance anomaly inference based at least on the anomaly indication calculated from the first and the second traceroute data collectors.

In some implementations, the master server can estimate a baseline latency state associated with transmission of information between a first point in the computer network and a second point in the computer network. Such a baseline latency state represents a distribution of discrete latency values stored in a baseline reservoir. Moreover, the master server can estimate a current latency state associated with transmission of information between the first point in the computer network and the second point in the computer network. Such a current latency state represents a distribution of discrete latency values stored in a recent sample queue. Subsequently, the master server can identify a presence of an anomaly between the first point and the second point by performing a comparison of the estimated baseline latency state and the estimated current latency state.

In some implementations, the master server receives traceroute data from numerous network sensors or traceroute data collectors. The traceroute data packets contain transmission latency data between each of the numerous traceroute data collectors and a set of target computing devices. The transmission latency data can represent transmission latencies observed at different periods of time. For example, a first set of traceroute data can represent transmission latencies observed from the time T1 to the time T2, while a second set of traceroute data can represent transmission latencies observed at a later (and possibly overlapping) period of time, for example from T3 to T4.

The master server can calculate expected latency values between each of the traceroute data collectors and the target computing devices based on the first set of traceroute data. In addition, the master server can calculate current latency values between each of the traceroute data collectors and the target computing devices based on the second set of traceroute data. The master server can further calculate the difference between the current latency values and the expected latency values for each traceroute data collector with respect to a computing target device or a group of computing target devices. Thereafter, the master server can infer an anomaly associated with one or more traceroute data collectors and one target computing device and/or a set of target computing devices.

Information about the anomaly can be used in a variety of different ways to improve the performance of the computer network. For instance, the master server may issue an automatic notification about the anomaly type, severity, location, etc. The recipients of this notification, including users, routers, and servers, can use this information about the anomaly to route traffic appropriately, e.g., to reduce congestion, avoid areas affected by connectivity problems, load balance, reduce latency, etc. For instance, if a domain name system (DNS) server receives the anomaly notification, the DNS server may respond to DNS requests based on the anomaly. Similarly, if the anomaly notification indicates that the anomaly affects a first Internet Service Provider (ISP) but not a second ISP, a router may route traffic via the second ISP to avoid the anomaly.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 2 illustrates a block diagram of an example of a master server including hardware and software modules.

FIG. 3 illustrates a block diagram of an example of a traceroute collector device including hardware and software modules.

FIG. 4 illustrates a process for determining a particular traceroute (shown with dark arrows on FIG. 1) by incrementing TTL.

FIGS. 6A-6C illustrate a traceroute data replacement policy including new traceroute data, recent traceroute data collection, and baseline traceroute data collection.

Figure 1:
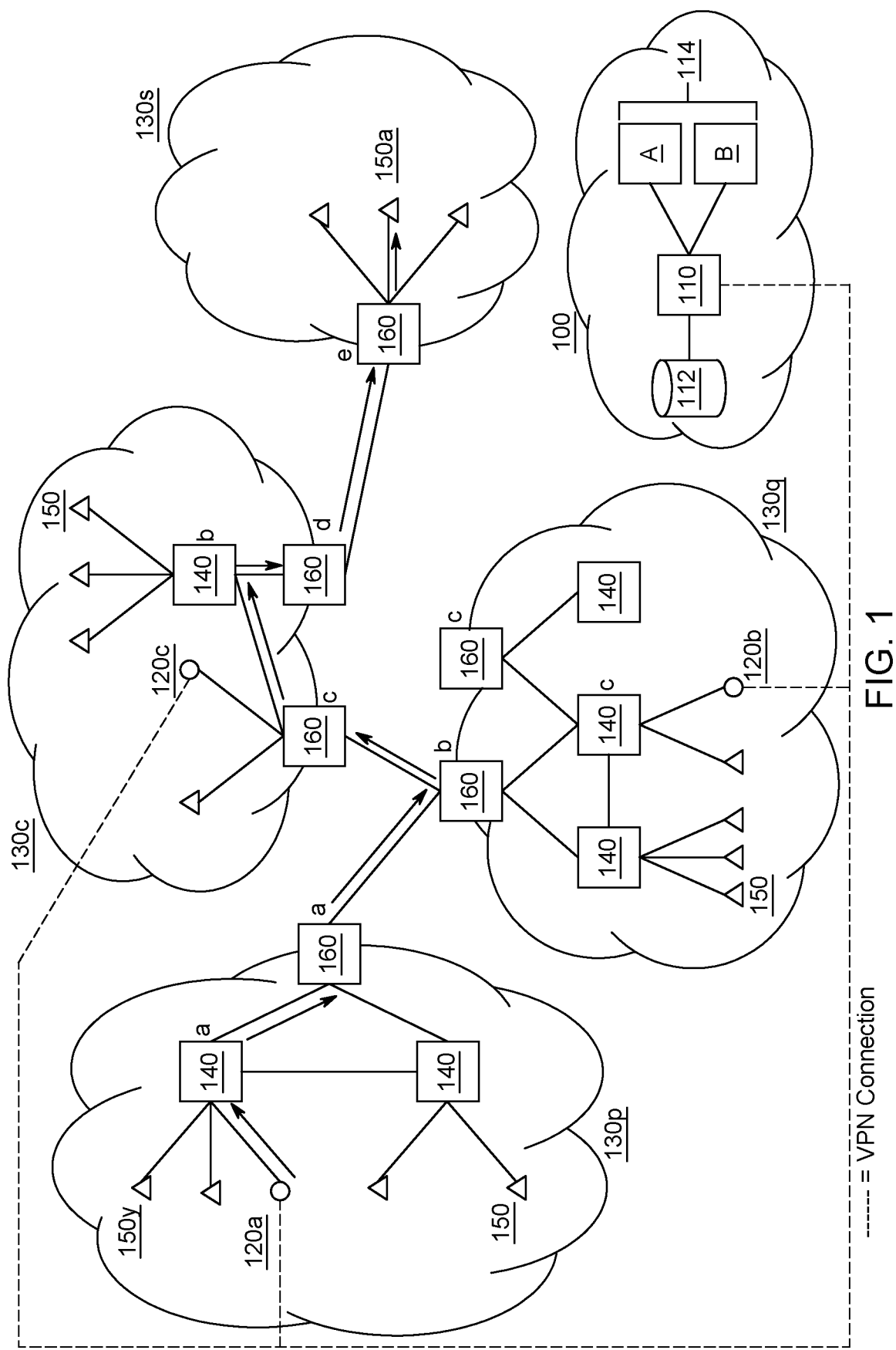
FIG. 1 illustrates an example of the performance alert system including a master server, routing devices, traceroute collector devices, and target computing devices.

Features and advantages of the present technology will become more apparent from the detailed description set forth below when taken in conjunction with the drawings.

DETAILED DESCRIPTION

Following below are more detailed descriptions of various concepts related to, and embodiments of, inventive systems, methods, and apparatus to generate information transmission performance alerts at a local and global scale. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Introduction

One measure of internet performance is the time delay, or latency, associated with transmitting a packet between two points on the internet. The total latency depends on the time that it takes for the packet to propagate between its source and destination. The latency has a lower bound given by the product of the physical distance separating the two points and the speed of light. In practice, the total latency depends on the time it takes to the packet to propagate along optical fiber, etc., between the two points. The total latency also depends on the time that it takes for intermediate devices, such as routers, switches, and bridges, to route the packet between its source and destination. In some cases, there may be many paths between a particular pair of points, and each path may have a different latency. The latency for each path may also fluctuate due to traffic congestion, equipment failures, etc. In some cases, these fluctuations may be caused by cyclical variations in internet use (e.g., daily fluctuations associated with streaming video in the evening). In other cases, these fluctuations may represent anomalous or irregular deviations in internet traffic patterns caused by equipment failures, etc.

Fluctuations in internet traffic can be identified and tracked using a traceroute utility to measure latency from each collector in network of globally distributed collectors, or collector network for short. As understood by those of skill in the art and explained in greater detail below, traceroute is a utility that records the route through the internet between a source computer (e.g., a collector) and a specified destination computer. Traceroute data includes both the addresses of the routers and other devices along the route to the destination as well as the latency associated with each hop along the route to the destination.

The network of globally distributed collectors collects traceroute data for at least a portion of the networks and devices connected to the internet. In aggregate, the collector network may monitor approximately 2,000,000 unique addresses in a typical day. The collector network may collect traceroute data more frequently for some devices, such as routers located at high-traffic nodes, than for other devices. In addition, different collectors in the collector network may collect traceroute data for the same destinations, different destinations, different routes to the same destination, and/or hops that are common to several routes.

The traceroute data can conceived of as a stream of data that contains measurements to some points on the internet being gathered at roughly daily frequency and measurements to other (more commonly traversed) points on the internet might be measured many times per second. To explain further, each traceroute can be decomposed into a set of [collector, responder, latency] tuples. A trace from collector A, that elicits successful hop responses from hops W, X, Y, and Z (e.g., A→W (10 ms)→X (30 ms)→Y (45 ms)→Z (55 ms)) becomes:

[A, W, 10 ms]
[A, X, 30 ms]
[A, Y, 45 ms]
[A, Z, 55 ms]

As these tuples emerge from the trace decomposition step, they no longer have path information contained within them. Furthermore, different [collector, responder] pairs may appear in the data stream at different rates, since commonly traversed routers (like W, X, and Y) tend to be observed/measured repeatedly, while the endpoint (Z) might only be seen occasionally (e.g., once per day). Each [collector, responder] pair has its own recent sample queue and baseline reservoir. The sizes of the queue and reservoir can be tuned based on the frequency of observation, which is unique per pair.

The collector network computes latency data for many of the IP addresses on the internet from the traceroute data and accumulates the latency data as baseline latency data. (The traceroute data contains path information that in some cases may be ignored by this system) This baseline latency data may include a distribution of latencies, or latency state, associated with each monitored IP address by each collector in the collector network. Because the collector network collects traceroute data on an on-going basis, it also detects changes in latencies due to changes in the number and placement of nodes and connections on the internet. In other words, each hop response along a route being traced can be treated as a de novo latency measurement between the traceroute collector and the node associated with the particular hop that responds. As a result, the most recent traceroute data collected by the collector network represents the internet's current state (or, more precisely, the state of the internet when the data was collected). As collector network collects updated recent traceroute data, it adds previously collected traceroute data to the baseline latency data, so the baseline latency data tracks the evolution of internet connections over time. As a result, the baseline latency state can describe the normal/common order of the internet with respect to a geographical region, a target computing device, a set of interconnected routing devices, and/or one or more target computing devices.

An alert system that is part of or operably coupled to the collector network computes similarities between the baseline latency data and more recently collected latency data. For example, the alert system may compare the current latency state (recently measured distribution of discrete latency values) for packet transmissions between a particular pair of points on the internet to the baseline latency state (baseline distribution of discrete latency values) between the same pair of points. The alert system may perform this comparison by calculating one or more similarity metrics to determine if the current latency state represents an internet anomaly. The alert system may also determine anomaly-specific information including but not limited to the affected geographical area, alternative unaffected traffic routes, and classification of the anomaly.

If the comparison shows that the current latency state is anomalous, then the alert system may issue a performance alert indicative of the anomaly, the affected routes, alternative unaffected routes, anomaly type, etc. The performance alert could be generated after observing anomalies on a group of IP addresses belonging to a particular network in a particular location, as seen from a set of collectors (also known as a set of related IP/collector tuples). This helps prevent false-positives due to misbehavior of a single network node or network performance problems at a single collector. Once an alert is generated, it might be sent to a customer who has expressed an interest in the networks or geographic areas affected, or to an analyst for further investigation.

To ensure a proper comparison between the current and baseline latency states, the collector system may use the same acquisition process (or set of processes) to collect and determine the latency states and underlying discrete latency values. Using consistent latency collection and determination processes reduces or prevents false positives due to changes in measurement noise from appearing in the comparisons. In addition, the latency value distributions in for the current and baseline latency states may be selected to be large enough to capture dynamics, but small enough to exhibit changes in latency due to anomalous routing behavior.

A System for Detecting Computer Network Traffic Anomalies

FIG. 1 illustrates an example of a performance alert system that detects performance anomalies in a computer network, such as the internet. The performance alert system shown in FIG. 1 includes a performance alert server 110 (also known as a master server 110), which is coupled to a performance alert database 112, one or more clients 114, and a network of traceroute collectors 120. For clarity, FIG. 1 shows only one performance alert server 110 and database 112, though the system 100 may include and/or use multiple synchronized master servers 110 and databases 112. When multiple master servers 110 are used, the master servers 110 can be synchronized for processing data that can be distributed over multiple databases 112. Accordingly, the databases 112 can be synchronized and thus can communicate using wired and/or wireless communications protocols and/or techniques.

The traceroute collectors 120 are real or virtual machines that reside within the data centers of their respective providers, each of which belongs to an Autonomous System (AS) 130, or routing domain. In operation, the traceroute collectors 120 measure latencies associated with routes to the routers 140, target computing devices 150, and Border Gateway Protocol (BGP) routers 160 (also known as border routers 160) within their own ASes 130 and within other ASes 130.

An AS 130 can be thought of as a zip code of computing devices 150—i.e., each AS 130 can be pictured as a neighborhood of the internet that is based on an ISP and not necessarily geographic in scope. Within each AS 130, there are Border Gateway Protocol (BGP) routers 160 (also known as border routers 160) and other routers 140 that implement the routing policy of the AS 130 and maintain physical connections to BGP routers 160 in neighboring ASes 130. At the time of filing, the number of ASes on the global internet is over 51,000.

More formally, an AS 130 is a connected group of IP networks with a single, clearly defined routing policy that is controlled by a common network administrator (or group of administrators) on behalf of a single administrative entity (such as a university, a business enterprise, a business division, etc.). Nodes within a given IP network in an AS 130 share the same network prefix, employing individual IP addresses within that prefix for internet connectivity. Most Autonomous Systems 130 comprise multiple network prefixes. An AS 130 can share routing information with other ASes 130 using BGP, which is an exterior gateway protocol (EGP) used to perform inter-domain routing in TCP/IP networks.

Routing information can be shared within an AS 130 or between ASes 130 by establishing a connection from a border router 160 to one of its BGP peers in order to exchange BGP updates. As understood by those of skill in the art, the process of exchanging data between border routers 160 is called "peering." In a peering session, two networks connect and exchange data directly. An internal BGP peering session involves directly connecting border routers 160 within a single AS 130. An external BGP peering session involves connecting border routers 160 in neighboring ASes 130 to each other directly.

Traceroute collector devices 120 probe routes among routers 140 and border routers 160 along the way to specific targets (which can be any device connected to the internet) and transmit traceroute data. The traceroute collector devices 120 can forward the collected message data to the master server(s) 110 that store or archive the data in one or more databases 112 as shown in the FIG. 1. The master server(s) 110 process the traceroute data from the database (s) 112 and provide clients 114 with tools for accessing, manipulating, and/or otherwise displaying the processed data, which can be used monitor network paths, detect performance anomalies, and make routing decisions based on the network anomalies. The data allows the clients 114 to monitor network paths from multiple vantage points (collector devices 120).

The database 112 can also include other data, such as global routing state, routing registry data, domain name system (DNS) data, internet network data and/or other data related to or derived from traceroute data. These data can be used to aggregate, correlate, and cluster observed latency anomalies as well as support a human operator or analyst attempting to understand the data.

Master Server and Traceroute Collector Devices

FIG. 2 illustrates a block diagram of an example of a master server 110 that includes a processor 218 coupled to a user interface 212, a communication interface 219, and a memory 214, which stores executable instructions 216. These executable instructions 216 define an analyst engine 217, which, when implemented by the processor 218, analyzes traceroute data to identify performance anomalies in internet traffic.

The processor 218 can include one or more high-speed data processing units to execute program components for executing user and/or system-generated requests. Often, these high-speed data processing units incorporate various specialized processing units, such as, but not limited to: integrated system (bus) controllers, memory management control units, floating point units, and even specialized processing sub-units like graphics processing units, digital signal processing units, and/or the like. Additionally, the processor 218 may include internal fast access addressable memory, and be capable of mapping and addressing memory beyond the processor itself; internal memory may include, but is not limited to: fast registers, various levels of cache memory (e.g., level 1, 2, 3, etc.), RAM, ROM, etc. The processor 218 may access the memory 214 and the executable instructions 216 through the use of a memory address space that is accessible via instruction address, which the processor 218 can construct and decode allowing it to access a circuit path to a specific memory address space having a memory state and/or executable instructions.

The communication interface 219 may accept, connect, and/or communicate to a number of interface adapters, conventionally although not necessarily in the form of adapter cards, such as but not limited to: input output (I/O) interfaces, storage interfaces, network interfaces, and/or the like. For example, a network interface included in the communication interface 219 can be utilized to send and receive information from the traceroute collector device 120 in FIG. 3.

The user interface display 212 can include a Cathode Ray Tube (CRT) or Liquid Crystal Display (LCD) based monitor with an interface (e.g., DVI circuitry and cable) that accepts signals from a video interface. Alternatively, the user interface display 212 can include a touchscreen and/or other content display device. The video interface composites information generated by executable instructions 216 which are stored in a memory 214 and executed by the processor 218. The executable instructions 217 include an analyst engine module 217 with a set of instruction to process and analyze data obtained from one or more traceroute collector devices 120. The user interface display 212 may include a conventional graphic user interface as provided by, with, and/or atop operating systems and/or operating environments such as Apple OS, Windows OS, Linux, Unix-based OS and the like. The user interface display 212 may allow for the display, execution, interaction, manipulation, and/or operation of program components and/or system facilities through textual and/or graphical facilities. The user interface display 212 provides a facility through which users may affect, interact, and/or operate a computer system. A user interface display 212 may communicate to and/or with other components in a component collection, including itself, and/or facilities of the like. The user interface display 212 may contain, communicate, generate, obtain, and/or provide program component, system, user, and/or data communications, requests, and/or responses.

FIG. 3 illustrates a block diagram of an example of a traceroute collector device 120 including hardware and software modules. The traceroute collector device 120 includes a communication interface 322 with characteristics like those of the previously described communication interface 219. The processor 324 can also have characteristics analogous to those of the previously described processor 218. The memory 326 includes executable instruction 328 and a traces probe module 329 with instruction to collect traceroute data from one or more target computing devices (for example, target computing devices 150*a*, 150*b* and 150*c* in FIG. 1).

Traceroute Data and Data Collection

FIGS. 1 and 4 illustrate working principles of a traceroute data system. To perform a traceroute, traceroute collector 120*a* sends a first packet to the destination computer (150*a*) using the Internet Control Message Protocol (ICMP). The traceroute collector 120*a* also specifies a hoplimit value for the first packet, known as the "time to live" (TTL) that is equal to 1. When the first router 140*a* receives the first packet, it decrements the TTL (from 1 to 0). Upon processing a packet with TTL=0, the first router returns a "Time Exceeded" message 401a to the traceroute collector 120a instead of forwarding the first packet to the next router along the path to destination computer 150a. This enables traceroute collector 120a to determine the latency associated with the hop to the first router 140a on the path to the target computer 150a. The traceroute collector 120a then sends a second packet to the target computer 150a with a TTL=2. The second router 160a returns another Time Exceeded message, and so forth. Subsequent packets (containing TTL=3 through TTL=7) elicit Time Exceeded messages from routers 160b, 160c, 140b, 160d, and 160e. When the destination computer 150a receives the final packet with TTL=8, it returns an "Echo Reply" message 402 to the traceroute collector 120a, enabling the traceroute collector 120a to measure the latency of the final hop.

By increasing the TTL each time it sends a packet and monitoring the "TTL exceeded" responses 401a, 401b, 401c, and so on from the intermediate routers, the traceroute collector device 120a discovers successive hops on the path to the destination computer 150a. The order and timing of the collected "TTL exceeded" responses and the "ICMP Echo Reply" 402 are used by the traceroute collector device 120a to build a list of routers traversed by the ICMP packets en route to the target device 150a. Each hop along the path has a round-trip latency calculated by subtracting the sending time of the ICMP Echo Request from the arrival time of the response (TTL Exceeded or Echo Reply).

Figure 5A:
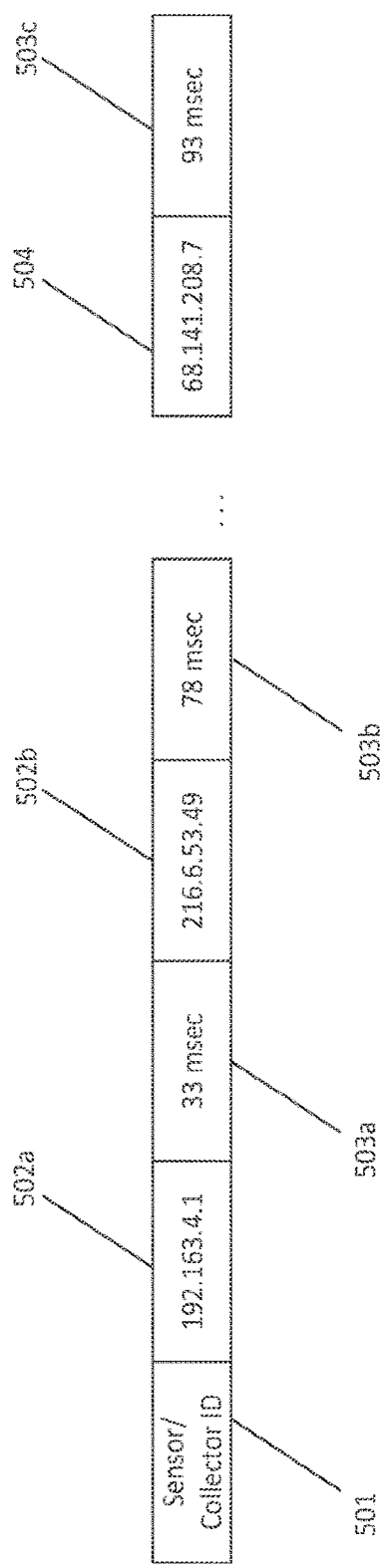
FIG. 5A illustrates an example of traceroute data obtained by the collector with respect to the target computing device.

FIG. 5A illustrates an example of traceroute data obtained by the traceroute collectors 120 in FIG. 1. The traceroute data in FIG. 5A shows the path data packets take from the sensor or traceroute collector device to the target computing device. The traceroute data comprises identifiers for each device in the traceroute, including an identifier and/or and IP address 501 for the traceroute collector device 120. The IP address contained in 502a and 502b can represent routers that are part of a global or local computer network. The traceroute data also includes times 503a and 503b representing the round-trip time it took to the traceroute collector device 501 to obtain responses from routers 502a and 502b, respectively. Similarly, the time 503c represents the time it took to the traceroute collector device 120 to obtain an ICMP Echo Reply from the target computing device identified by identifier 504.

In some instances the traceroute data obtained by one or more traceroute collector devices can be processed by the master server 110 to generate an intermediate human readable format in a data structure as shown below:

```
tr_base_fields = [('dcv', str), # data version
    ('ts', int),    # timestamp of start of trace
    ('protocol', str), # [I]CMP, [U]DP, [T]CP
    ('port', int),
    ('collector_ip', str),
    ('collector_external_ip', str),
    ('collector_name', str),
    ('target_ip', str),
    ('halt_reason', str),# [S]uccess, [L]oop, [U]nreachable, [G]ap
    ('halt_data', int), # additional information for failed trace
    ('hoprecords', T5HopList)]
```

The data structure tr_base_fields can include data version dcv is field, representing the current internal data format (e.g., T1 or T5); a is field specifying a time when the traceroute started; a protocol field specifying one or more internet protocols, for example, Internet Control Message Protocol (ICMP), User Datagram Protocol (UDP), Transmission Control Protocol (TCP), and the like protocols; a port field specifying a port number or identifier associated with the transmission of the traceroute data; a collector_ip field specifying traceroute collector device IP address; a collector_external_ip field specifying collector device external IP address; a collector_name specifying a collector device name; a target_ip field specifying a target device IP address; a halt_reason field specifying a halt cause, for example, success, loop, unreachable, or gap; and a hoprecords list representing the hops recorded during the traceroute data transmission.

A hoprecords list can have one or more elements, where each element represents a target device or a type routing device in a traceroute from a traceroute collector and a target device. A routing device can be a gateway router regulating data traffic between IP networks. In addition, the routing device can direct data packets from one interface to another within IP networks having a static or dynamic set of rules dictating how packets can reach a targeted device. A data structure to represent a hoprecords list element is provided below:

```
ex = [h.ip,       # hop IP address
   h.rtt,         # RTT in milliseconds
   h.dist,        # TTL distance on the packet that incurred the reply
   h.replyttl]    # TTL of the reply packet from the target
   mpls_tags      # numeric MPLS tags are appended as comma-separated
values
```

The data structure ex can include an IP address h.ip representing a routing device or a target device; a roundtrip delay time h.rtt representing the time taken to receive an acknowledgment transmission from a receptor device (for example, 401a-401c and 402 in FIG. 4), in response to a traceroute transmission sent by a traceroute collector device (for example, 120c in FIG. 4); Time to Live (TTL) distance h.dist specifying a limit of hops a traceroute transmission packet can take before considered an unsuccessful transmission; a TTL distance h.replyttl specifying a number of hops an acknowledgement to a traceroute transmission can take before considered an unsuccessful transmission; and one or more Multiprotocol Label Switching (MPLS) tags mpls_tags specifying for example label-switching paths to determine in advance a route to take within a private and/or a public network.

An example of the collected traceroute data organized as shown in the tr_base_fields and ex data structures is provided below:

```
dcv=T5; ts=1419460683; protocol= ICMP; port=0; collector_ip=
162.243.114.207
collector_external_ip=162.243.114.207;
collector_name=vps01.nyc3;   target_ip=188.241.40.144;
halt_reasone=Success; halt_data=11;
hop records=   {h.ip=192.241.164.241; h.rtt=0.445ms; h.replyttl=63
   h.ip=62.115.44.241; h.rtt=0.468ms h.replyttl = 62}
```

Figure 5D:
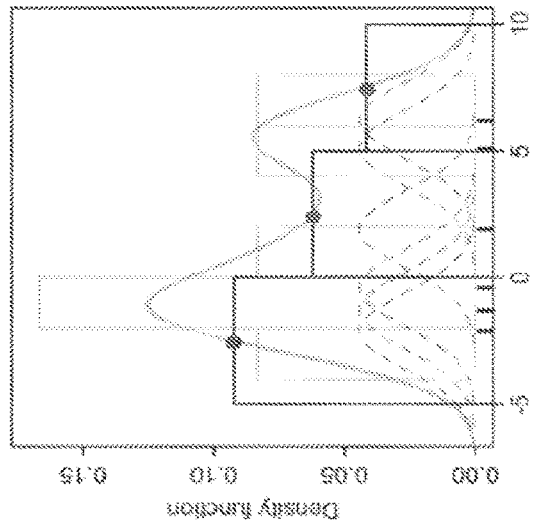
FIGS. 5B-5D illustrate an example of data smoothing or normalization process.
Figure 5C:
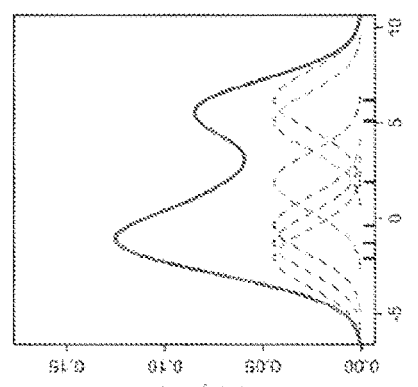
Figure 5B:
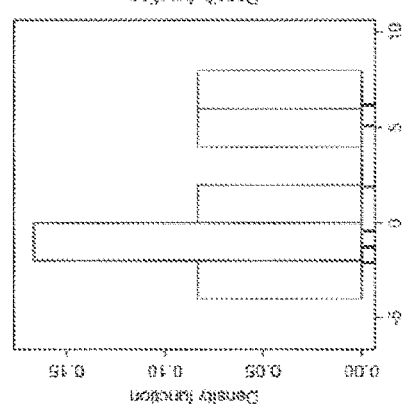

FIGS. 5B-5D illustrate an example of data smoothing or normalization process that can be applied to a distribution of traceroute data including latency values as the data shown in FIG. 5A. In some implementations, the master server 110 can prepare the traceroute data received by one or more collectors to be processed. The preparation of data can include the rejection of outlier values and/or other values considered as noise within the traceroute data. For example, latency data above and/or below some percentile (e.g., the 10th, 15th, 20th, or 25th percentile) can be omitted from the distribution. In addition, the master server 110 can derive a kernel density graph (FIG. 5B) from a distribution of discrete latency values (FIG. 5C) obtained from the traceroute data. The kernel density graph can be estimated for each distribution received by the master server by, for example, applying a sum-of-Gaussians technique with a kernel width of $\sigma^2$. Thereafter, the master server 110 can compute each distribution over a shared basis with equal population size, e.g., by measuring the height of one or more kernel distribution estimates by population size or by resampling new distributions from the kernel distribution estimates. The bandwidth of the kernels is a free parameter which can be configured on case by case basis. Similarly, the sub-intervals, bins, or buckets are free parameters covering a range of data, which can also be configured accordingly. FIG. 5D illustrates an overlapped kernel density estimate corresponding to the discrete data on the histogram shown on the figure background.

Accumulating and Updating Baseline Latency States

FIGS. 6A-6C illustrate a traceroute data replacement policy for obtaining, accumulating, and updating latency states based on new traceroute data, recent traceroute data, and baseline traceroute data. The master server 110 receives a data stream comprising traceroute records collected by one or more traceroute collector devices 120. Each of the traceroute records represents one or more hops between a given traceroute collector device 120 and another node in the computer network. As shown above, each hop record includes the round-trip time (latency) of the hop. Each hop record may also include the timestamp, hop distance, and reply TTL as shown in the hop_record data structure.

The master server 101 sorts the traceroute records in the data stream based on the timestamps is in the tr_base_fields data structure. It also decomposes the hop records of the timestamp-sorted traceroute records into a set of time-ordered data sub-streams, where each sub-stream 604 comprises samples between a single collector and a single receptor IP address. These samples are directed to sub-streams 604 based on the collector described in the tr_base_fields data structure and the receptor IP addresses in the h.ip field of each hop_record of the measurement.

Samples can be temporarily retained in the memory 114 in a Recent Sample Queue (RSQ) 601 as shown in FIG. 6A. In some instances of the master server 110, the received samples can be pushed onto the tail of the RSQ 601. The RSQ 601 can include a preconfigured retention capacity. FIG. 6B shows that whenever the retention capacity of the RSQ 601 is exhausted, the master server 110 can shift the oldest sample from the head of the RSQ 601 into a baseline reservoir (BR) 602.

If desired, the retention capacity of the RSQ 601 can be tuned: generally, a smaller RSQ retention capacity allows the system to respond to anomalies more quickly, but tends to make the system more sensitive to false positives. In some cases, each [collector, responder] pair has a RSQ retention capacity based on the observed frequency with which the collector receives samples from the responder. If the collector receives samples frequently from the responder (e.g., because the responder is a router at an internet chokepoint), the system may set the RSQ retention capacity to keep the received samples for a relatively short time. It may also keep only a fraction of the received samples (e.g., every tenth sample). And it may keep a larger number of samples. But if the collector receives samples relatively infrequently from the responder (e.g., because the responder is a client device at an internet dead-end), the system may set the RSQ retention capacity to keep the received samples for a relatively long time and/or keep fewer samples total in the RSQ 601. For example, a RSQ 601 that holds fewer than 10 samples is likely to generate large numbers of false positives with only a few deviant samples, whereas an RSQ 601 that holds >200 samples might react slowly except to only the most frequently observed [collector, responder] pairs.

Similarly to the retention capacity of the RSQ 601, the retention capacity of the BR 602 can be preconfigured to retain a predetermined number of samples. The BR retention capacity may be set for each [collector, responder] pair based on observed frequency with which the collector receives samples from the responder, just like the RSQ retention capacity can be tuned. Typically, the BR 602 should hold approximately 5-10 times as many samples as the corresponding RSQ 601.

As shown in FIG. 6C, once the BR 602 reaches its retention capacity, one or more samples can be added to the BR 602 by removing a corresponding number of samples 603 from the BR 602 and replacing them with samples taken from the RSQ 601 according to one or more replacement policies, for example, a turntable replacement policy and the like.

In some instances, a replacement policy, also known as an eviction policy, can specify randomly selecting a sample from the BR 602 for permanent eviction. In such a case, each sample may have the same probability of eviction. Moreover, each sample may have a probability to remain in the BR 602 equivalent defined by the function $[1-(1/s)]^m$ where s is the number of samples retained in the BR 602 and m is the number of additional samples placed in the BR 602.

The master server 110 can determine a transmission baseline latency state associated with the transmission of information between two or more devices based on the discrete latency values stored in the BR 602. The baseline latency state can be determined by calculating one or more descriptive statistics over the samples retained in BR 602, for example, measures of central tendency and/or measures of dispersion of the distribution of discrete latency values. Similarly, the master server 110 can determine a current latency state associated with the transmission of information between two or more devices based on the discrete latency values stored in the RSQ 601. The current latency state can similarly be determined by calculating one or more descriptive statistics over the samples retained in the RSQ 601, including but not limited to measures of central tendency and/or measures of dispersion.

In some instances, the distributions contained in the BR 602 and the RSQ 601 can be subjected to one or more sampling policies and/or normalization policies executed by the master server 110. For example, the master server 110 may apply a policy that omits outlier samples by specifying that samples below or above a threshold should not be taken into consideration when drawing an inference from the latency value distribution(s). In addition, the distributions in the BR 602 and RSQ 601 can be smoothed and/or normalized by any suitable operation before performing any statistical analysis and/or test. Suitable smoothing operations include but are not limited to determining a kernel density for each distribution, re-computing each of the distributions over a shared basis with equal population size, and the like.

The master server 110 can identify one or more information transmission anomalies by analyzing the differences between the baseline latency state and the current latency state. (FIGS. 11A-11D, described below, display samples from both the baseline reservoir and the current latency state.) Such an analysis can include discrete comparisons to determine the likelihood that the base latency state and the current latency state were drawn from the same population, for example, log-likelihood analysis, Pearson's Chi-squared test, and the like discrete comparison analysis. In other instances, the analysis can include continuous comparisons based on, for example, Kolmogorov-Smirnov analysis and similar statistical analysis that are sensitive to more than one difference among two distributions.

Figure 7:
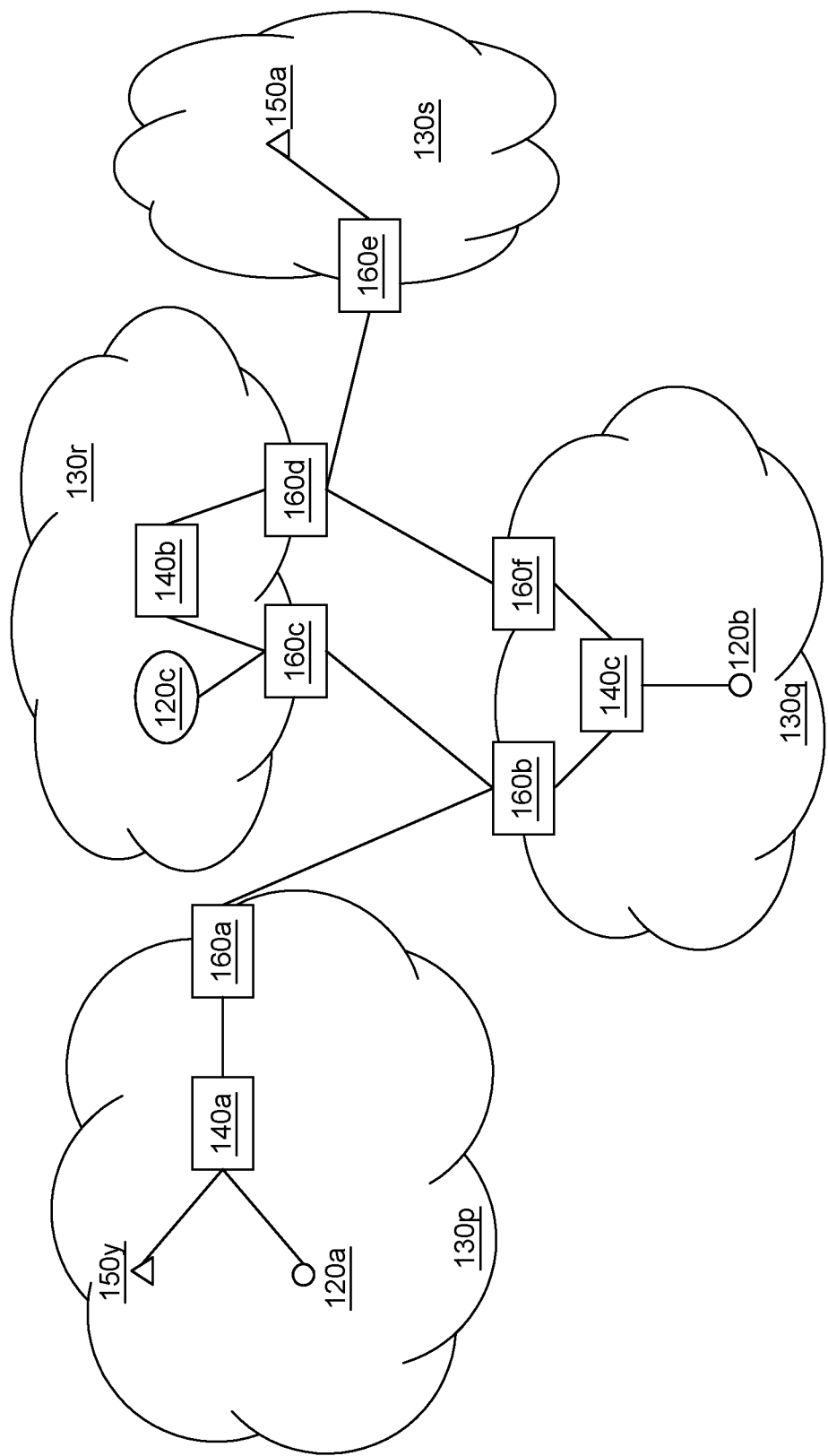
FIG. 7 illustrates a subset of the globally distributed system including the target computing devices, collector, and routing devices.

FIG. 7 illustrates a subset of the devices shown in FIG. 1, including target computing devices 150a and 150y; traceroute collectors 120a-120c; AS border routing devices 160a-160f; and internal routers 140a-140c. It shows how the master server 110 can determine an alternative information transmission route based on anomalies determined between two or more devices. For example, the computer device 150y has two paths to transmit information to the target device 150a. A first path includes the border router 160c and the internal router 140b. A second path includes the internal router 140c and the border router 160f. Both paths include border router 160a, 160b, and 160d. The collector devices/network sensors 120 are connected to the master server 110 and can send traceroute data to the master server 110 at preconfigured intervals.

The master server 110 can infer different conjectures based on the traceroute data provided by the collector device 120a. For example, a conjecture identifying an anomaly can be determine as aforementioned with respect to the data received from the collector device 120a in regards to the transmission of traceroute data to the target device 150a through a first path 140a-160a-160b-160c-140b-160d-160e. In parallel, the master server 110 can determine that there are no anomalies with respect to the data received from the collector device 120b in regards to the transmission of traceroute data to the target device 150a through a second path 140a-160a-160b-140c-160f-160d-160e. In such a case, the master server 110 can alert the device 150x about the anomaly and about the possibility of transmitting information to the target device 150a via a second path (i.e., 140a-160a-160b-140c-160f-160d-160e) that is not performing anomalously. In some instances the alternative path is recommended after considering additional transmission information for example, comparing the latency of the first and second path when the first path is not unsuccessful, determining if the transmissions to the first path were considered unreachable at some point within the path and the like conditions.

In some instances, the master server 110 can narrow an anomaly down to a specific link and/or geographical area based on the traceroute data. For example, provided that an anomaly was identified in the first path, if there is no anomaly detected between the collector device 120c and the target device 150y through a third path 160c-160b-160a-140a-150y, the master server 110 can infer that the anomaly is present somewhere in the partial path 160c-140b-160d, excluding the links connecting 160a-160b and 160d-160e from the affected route. This conjecture can be reaffirmed, disregarded, and/or further narrowed down to a specific link or geographical area by analyzing the traceroute data received from other collector devices over partially overlapping paths. If the inferences drawn from the devices 120 are contradictory or dissonant, the master server 110 may reconcile the inferences by assigning a coherency value to the data received by the traceroute data collector devices 120. In some instances, the coherency value can be a function of a reliability weight corresponding to each of the collectors and/or other reliability measures.

Detecting Performance Anomalies

Figure 8:
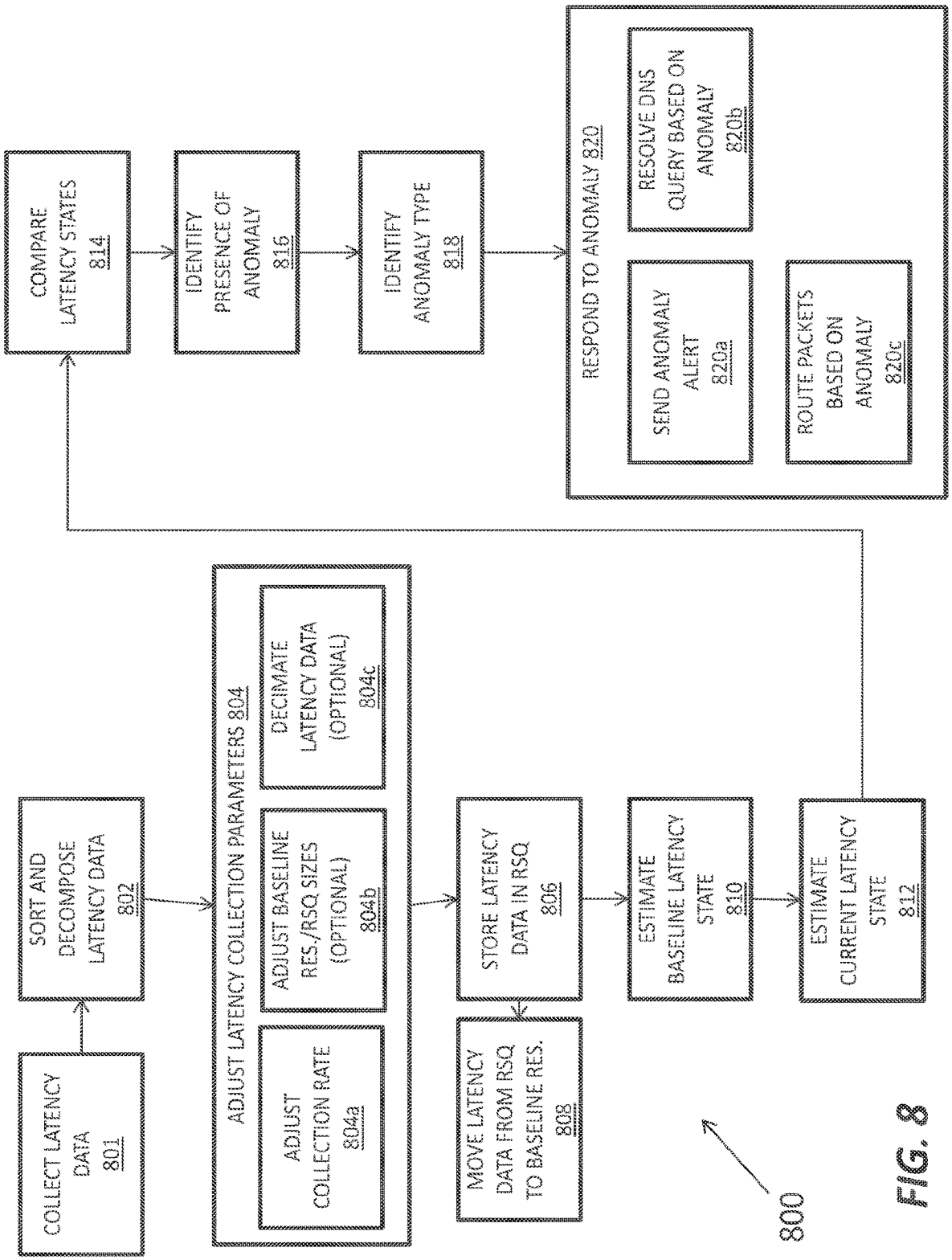
FIG. 8 depicts a method for detection of performance anomalies in a computer network, according to one embodiment of the present invention.

FIG. 8 depicts a method 800 for detecting performance anomalies in a computer network, such as the internet. In step 801, a processor (e.g., master server 110) receives latency data, such as traceroute data or ping data, that represents the transmission latency between a target device, such as a computer or router on the computer network, and one or more collectors in or coupled to the computer network (e.g., collector 120a). The latency data can comprise measurements from one or more traceroute data packets, each of which can be organized to contain the fields described above with respect to the tr_base_fields data structure. For example, the fields may indicate the latency associated with a hop or number of hops to different destinations (nodes) within the computer network. Each hop may be encountered enroute to another target as described above.

The latency data can also comprise latency measurements elicited by one or more ping packets (or ping), which can target a given IP address directly. Each ping packet is collected between an individual collector and a specific target destination within the computer network. Each ping packet measures a single round-trip time (latency) between the collector and the destination at a moment in time.

In step 802, the latency data is organized or arranged into time-ordered streams where each stream represents only the samples observed between a single collector and a single target device. In the case of traceroute data, these streams are obtained by ordering and decomposing traceroute measurements. Each hop record of a traceroute measurement can be understood as a de novo round-trip time (latency) measurement between the collector that originated the traceroute and the hop IP address. In the case of ping data, these streams are obtained simply by ordering and collating the distinct ping measurements between collectors and targets.

In some cases, the processor may adjust latency collection parameters (804) based on the location of the target device within the computer network and the amount of traffic to, from, or passing through the target device. For instance, the processor may reduce the collection rate (804a) or decimate the latency data (804c) before storing the latency data in a buffer (recent sample queue 601 in FIG. 6). For instance, the processor may decimate latency data associate with trips to and from a router that is transited frequently in order to filter high-frequency fluctuations in latency and to ensure that the buffers hold enough latency data to make meaningful estimates of the current and baseline latency states. The processor may also adjust the size of the buffers used to hold the latency data (recent sample queue 601 and baseline reservoir 602). For a typical target, the recent sample queue holds 25 samples and the baseline reservoir holds 175 samples. These numbers may be increased or decreased depending on the frequency with which the latency to the target is measured by the collector(s). (Note that step 804 can be performed at different points within the process flow depicted in FIG. 8.)

The processor stores the incoming latency data in the recent sample queue (806). The processor also moves older latency data from the recent sample queue to the baseline reservoir (808). For instance, the processor may replace the oldest latency sample in the baseline reservoir with the oldest latency sample from the recent sample queue at every measurement interval. Alternatively, the processor may replace a random latency sample in the baseline reservoir with a latency sample from the recent sample queue once per measurement interval.

The processor estimates the baseline latency state from the latency samples in the baseline reservoir (810) and estimates the current latency state from the latency samples in the recent sample queue (812). It compares the current and baseline latency states (814) and, if the comparison indicates anomalous network behavior, identifies a presence of an anomaly (816). The processor may also attempt to identify the type of anomaly (818), e g, a path change, congestion, connectivity failure, etc. and its location within the network and/or a particular geographic area. For example, the processor may identify one or more IP addresses, a geographic region, or both IP address and geographic regions associated with and/or affected by the anomaly.

The processor may estimate and compare the current and baseline latency states using any suitable comparison technique(s). For instance, the processor may generate and normalize current and baseline latency distributions, then compare the normalized distributions to determine a probability that the current latency performance is anomalous with respect to the historical latency performance. The processor may also calculate one or more descriptive statistics 805, including, for example, measures of central tendency and/or measures of dispersion of the distribution of discrete latency values. Thereafter, the master server 110 can calculate a value indicating the probability that a deviation between the current latency value and an expected latency value corresponds to a network performance anomaly 807. If the deviation is statistically significant, then it may be a symptom of an anomaly. In practice, $p \leq 0.00001$ is enough to consider a single collector/responder pair to be anomalous. These collector/responder pairs can be clustered to find networks or geographies that are encountering disruptions.

The processor may also respond to the anomaly 820 based on the type, affected area IP address(es), affected geographic location, and timing of the anomaly; a previously determined response policy; instructions from a user; etc. For instance, the processor may automatically send an anomaly alert (820a) to one or more users or other devices with information about the type, location, and timing of the anomaly. These devices include but are not limited to DNS servers, routers, load balancers, network optimization appliances, and configuration management systems.

For instance, the processor may send the anomaly alert to a DNS server that resolves DNS queries depending in part on whether or not there are any anomalies present in the computer network. As readily understood by those of skill in the art, a DNS server is a server that translates domain names into IP addresses that can be used to route packets through a computer network. DNS servers come in a variety of types, including authoritative DNS servers, caching DNS servers, and forwarding DNS servers. Under anomaly-free circumstances, a DNS server may resolve DNS queries according to a first predetermined policy, which may be set to achieve a desired latency, load balance, reduce cost, avoid or prefer routing traffic via a particular Internet Service Provider (ISP), etc. The DNS server may switch to another predetermined policy for answering DNS queries in response the anomaly alert from the processor. In some cases, the DNS server may have different policies for different types, locations, and severities of anomalies. Each policy may be predetermined or set or modified in response to the anomaly.

Put differently, if an anomaly affects the DNS server's ability to resolve DNS queries for a particular domain name according to the first predetermined policy, the DNS server may switch to a second predetermined policy that treats queries for that particular domain name differently. For instance, if the DNS server steers traffic to a first IP address in response to a given query under the first predetermined policy and an anomaly affects internet traffic to and from that IP address, the DNS server may steer traffic to a second IP address in response to the same query under the second predetermined policy. Likewise, the DNS server may steer traffic based on the geographic locations of the destinations, DNS query sources, and areas affected by the anomaly as well as based on the latencies associated with traffic routed among the corresponding IP addresses.

The processor may also automatically send the anomaly alert to a configurable network router (e.g., at a customer site) that enforces routing policies that account for anomalies. If the router has multiple available paths to the internet (e.g., via different ISPs), it can direct outbound traffic over the corresponding interface to the path (ISP) based on a predetermined policy (including load balancing, lowest cost, or best performance). The policy may also account for the presence of one or more anomalies and for different types of anomalies. As a result, if the router receives an anomaly alert indicating that traffic via a given ISP is likely to experience higher latency or other problems, the router may send traffic via an alternative ISP until the anomaly is resolved. If the router is collocated with one or more of the collectors 120 (FIG. 1), the collectors may view the internet from the router's perspective through each ISP interface by sampling the same targets through each ISP interface, identifying anomalies, and making programmatic suggestions to the policy engine on the configurable network router.

Figure 9:
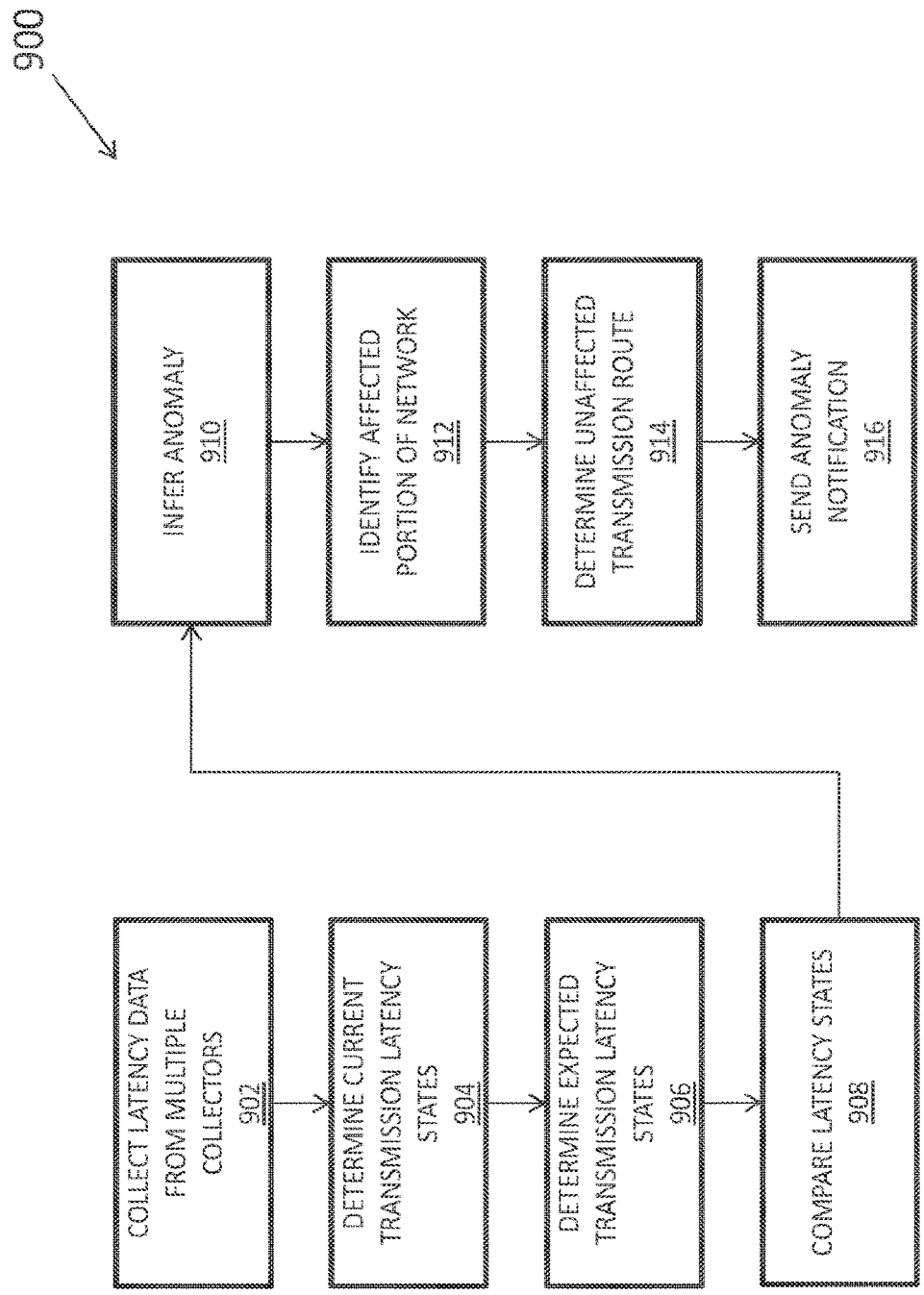
FIG. 9 depicts a method for detecting an anomaly in a computer network, according to an additional embodiment of the present invention.

FIG. 9 depicts another method 900 for detecting an anomaly in a computer network. In step 902, the master server 110 or other processor collects latency data from multiple collectors. This latency data may include traceroute packets from each collector to one or more other devices distributed throughout the computer network as described in greater detail above.

In step 904, the master server 110 determines the latency states associated with transmissions between collector and each target in the computer network based on the available data. The latency states may include or represent latency distributions and can be estimated using the techniques described above with respect to steps 810 and 812 in FIG. 8. For instance, the master server 110 may calculate a running mean, median, or mode of the latency values represented by the current latency state or fit a peak to a distribution of the latency values represented by the current latency state. The current latency state can describe a recent, close to real-time transmission state between each collector/target pair. The master server 110 may perform these calculations on a pairwise basis, e.g., between each collector and a first target, second target, and so on until every possible combination has been computed. (In some cases, it may not be practical or possible to estimate the latency states for collectors and targets for which there is no data or for which there is no connection).

The master server 110 also determines expected latency states for each collector/target pair. In some cases, the master server 110 may calculate the expected latency states from historical latency data as described above with respect to step 810 in FIG. 8. In other cases, the master server 110 may determine the expected latency states from user-specified data—that is, the user may set a desired latency or latency state, and the master server 110 may use this user-supplied information to determine the expected latency states. The master server 110 may also generate a predicted or desired latency state based on information provided by a user.

In step 908, the master server 110 compares the expected latency state and the current latency state. As part of the comparison, the master server 110 may reject discrete latency values above a first threshold or below a second threshold; construct a kernel density estimate of the expected latency state; and/or construct a kernel density estimate of the current latency state. The comparison can provide sufficient information to infer the presence of a network transmission anomaly (step 910) that affects communications with one or more of the target devices. In such a case, the master server 110 may identify the target device (s) affected by the anomaly (step 912), e.g., by IP address, geographic location, or other identifier as well as unaffected portions of the computer network (step 914). The master server generates and sends an alert message (step 916) similar to the one described above with respect to FIG. 8. The DNS servers, routers, and users that receive this alert message may use the information about the anomaly to resolve DNS queries, select ISPs, etc. in a manner that mitigates the anomaly's deleterious effects as described above.

Figure 10:
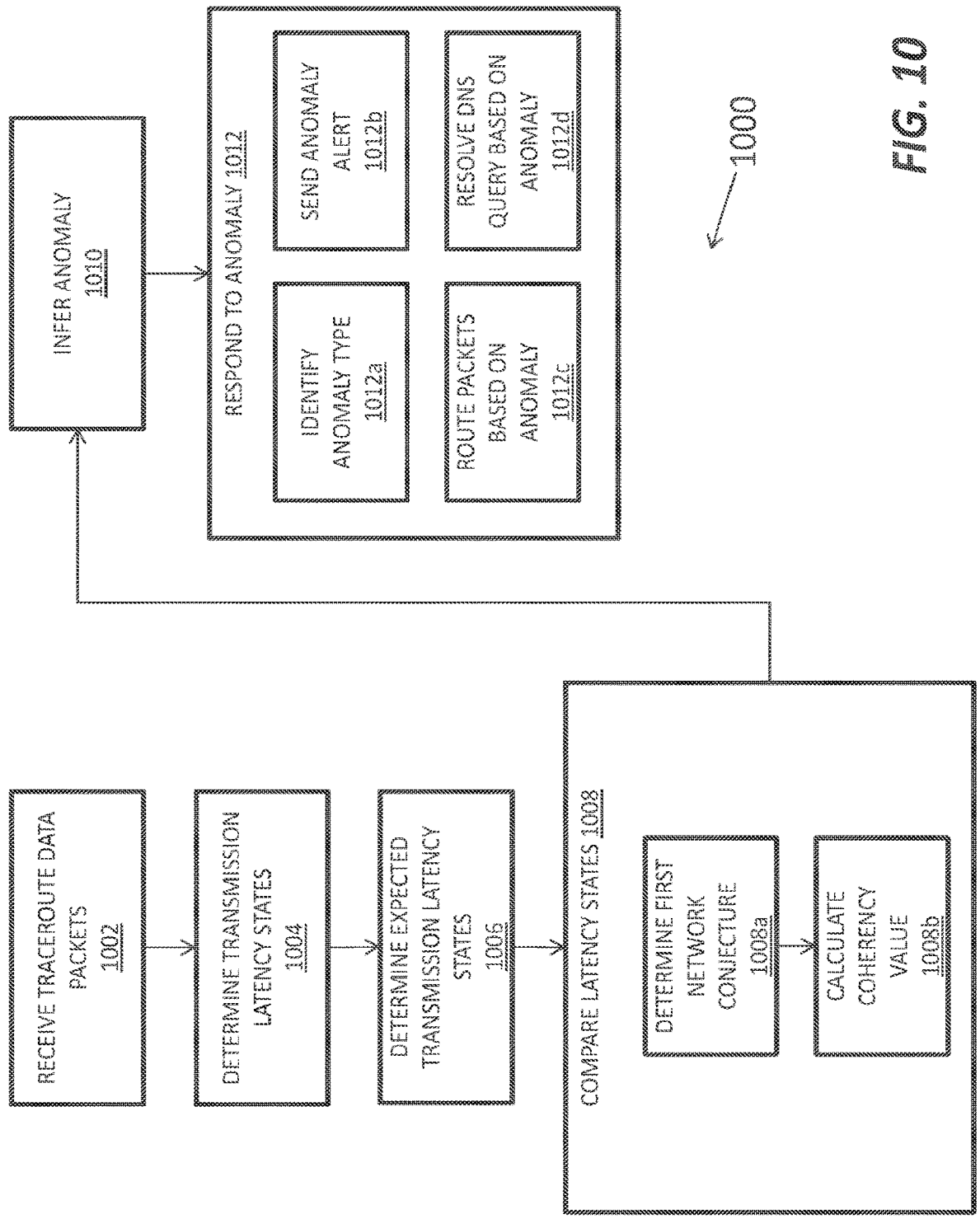
FIG. 10 depicts a method for detecting a performance anomaly in a computer network comprising a plurality of collectors, according to a further embodiment of the present invention.

FIG. 10 depicts yet another method 1000 for detecting a performance anomaly in a computer network (e.g., network 100 shown in FIG. 1). In step 1002, collectors receive traceroute data packets and provide latency information encoded in the traceroute data packets to the master server 110. In steps 1004 and 1006, the master server 110 determines the actual latency state based on the collected latency information and an expected latency state, e.g., using historical latency information and/or user input as described above.

In some implementations, the master server 100 compares the actual and expected latency states, e.g., by generating a probability that a packet will transit a particular path with a given latency. It uses this probability along with other factors, such as a reliability value associated with the collector device and the quality of the latency data, to determine a performance network anomaly conjecture (1004a). The conjecture can be interpreted as one of many or at least two antecedents which together are sufficient to generate a complete inference with respect to a type of network performance anomaly. The master server 110 calculates a coherency value (1004b) to harmonize discrepancies among conjectures derived from traceroute data received from other collectors. If the coherency value is above a predetermined anomaly threshold value, then the master server 110 can generate an inference indicating a network performance anomaly 1010. The master server 110 may respond to the anomaly (step 1012) by analyzing the traceroute data using one or more artificial intelligence techniques to diagnose or classify an anomaly type (1012a). It may also send an anomaly alert (1012b), route packets based on the anomaly (1012c), and/or resolve DNS queries (1012d) based on the anomaly as described above.

Performance Anomaly Alerts

Figure 11A:
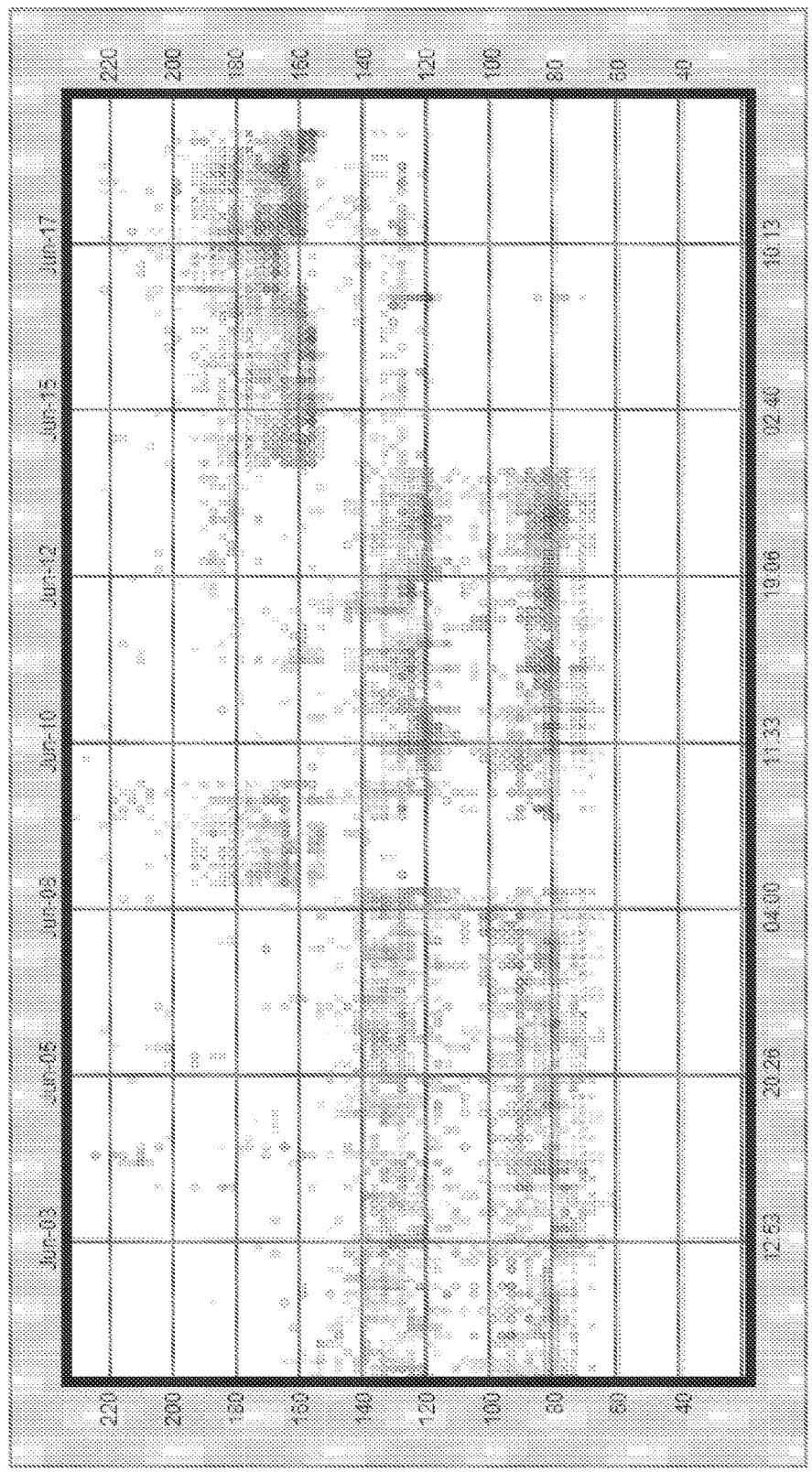
FIG. 11A is a plot of round-trip latencies as measured to a group of IP addresses controlled by ScopeSky Communication and Internet Ltd. (AS50597) in Iraq, from a set of three distinct (but geographically proximal) traceroute collectors.
Figure 11B:
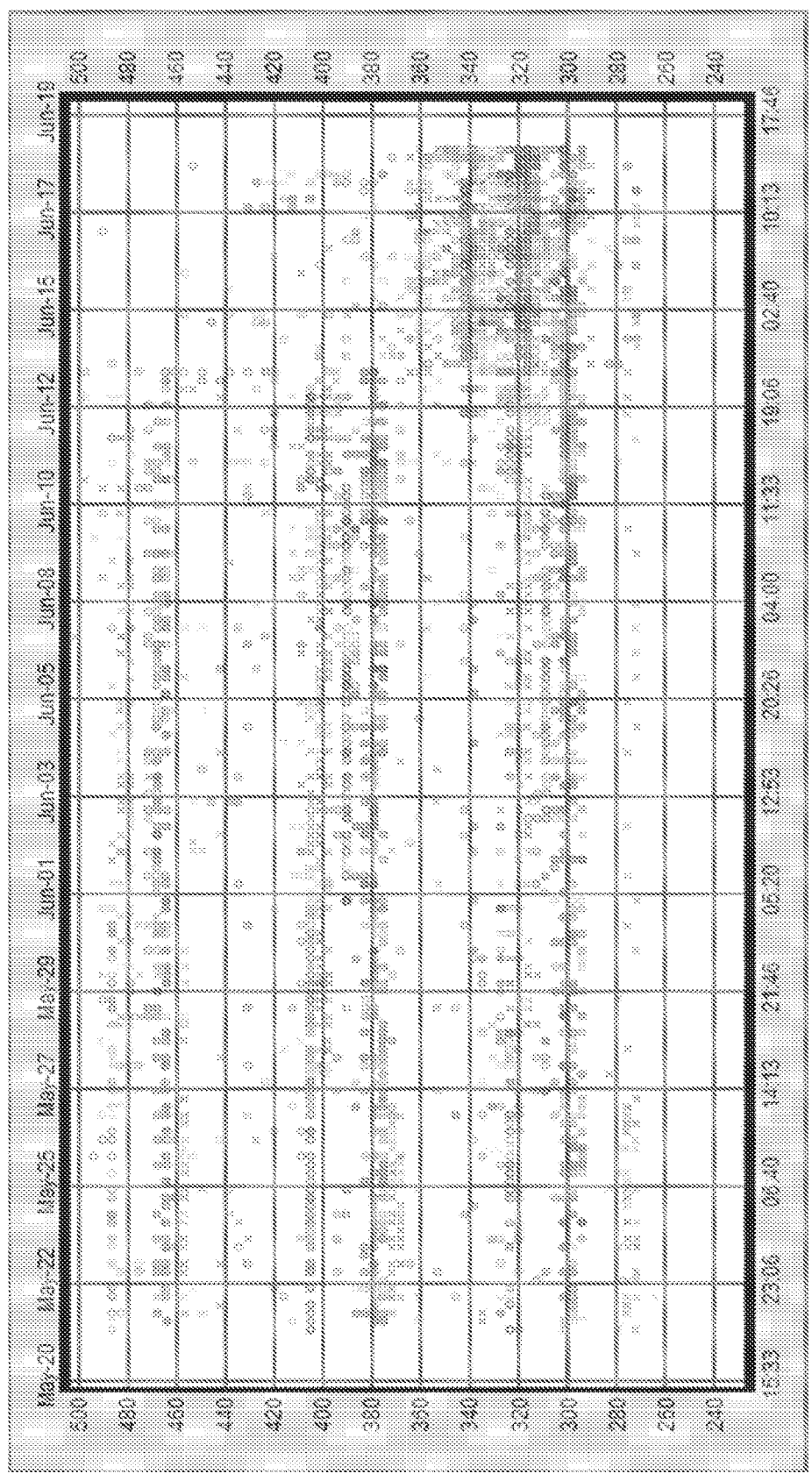
FIG. 11B is a plot of round-trip latencies as measured to IP addresses in a particular network prefix (222.126.128.0/23) controlled by Pacnet in China, from a set of three similar collectors.
Figure 11C:
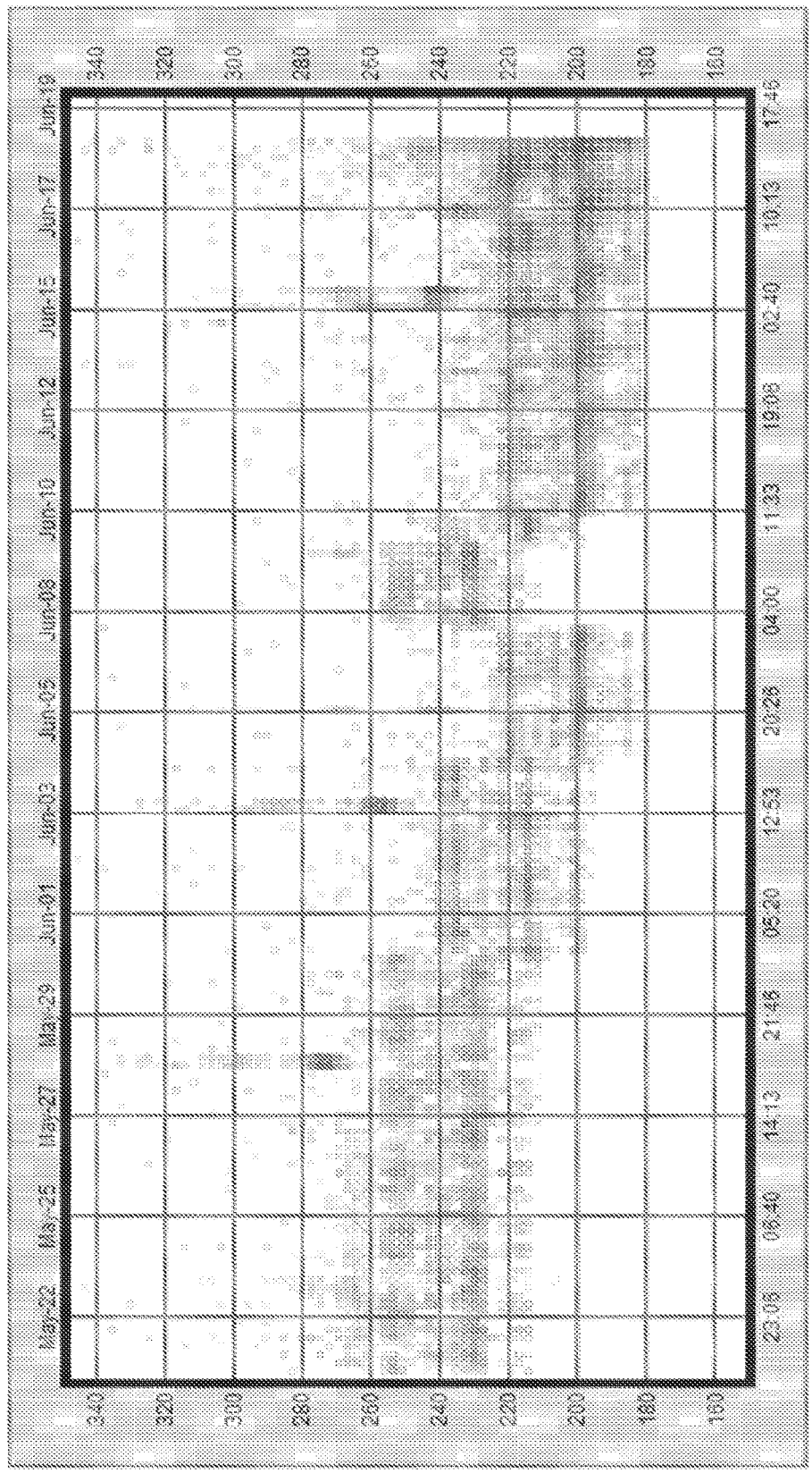
FIG. 11C is a plot of round-trip latencies as measured to addresses controlled by TENET (AS2018) in South Africa, from a set of three similar collectors.

In some instances, the master server can detect different types of anomalies and provide a graphical and/or textual output through the master server's user interface display 212. FIGS. 11A-11D illustrate a set of real-world anomalies detected by the alert system, with different symbols representing measurements by different collectors. FIGS. 11A-11C appear to be anomalous path changes, and FIG. 11D appears to be an anomalous congestion event.

More specifically, FIG. 11A is a plot of round-trip latencies as measured to a group of IP addresses controlled by ScopeSky Communication and Internet Ltd. (AS50597) in Iraq, from a set of three distinct (but geographically proximal) traceroute collectors. The plot shows a transition between a typical bimodal distribution (with peaks at approximately 80 ms and 130 ms) and a degraded, slower unimodal distribution (with a peak varying slightly around 160-170 ms).

FIG. 11B is a plot of round-trip latencies as measured to IP addresses in a particular network prefix (222.126.128.0/23) controlled by Pacnet in China, from a set of three similar collectors (displayed in different colors). The plot shows three separate modes, each separated by approximately 80 ms (at 310 ms, 390 ms, and 470 ms). The performance improves on June 13 as the upper modes fall and are only separated from the fastest results by 10-20 ms.

FIG. 11C is a plot of round-trip latencies as measured to addresses controlled by TENET (AS2018) in South Africa, from a set of three similar collectors (displayed in different colors). The plot shows latencies (mostly) improving progressively, but there are two modes (separated by approximately 20 ms) that remain independent as they become 40 ms faster.

Figure 11D:
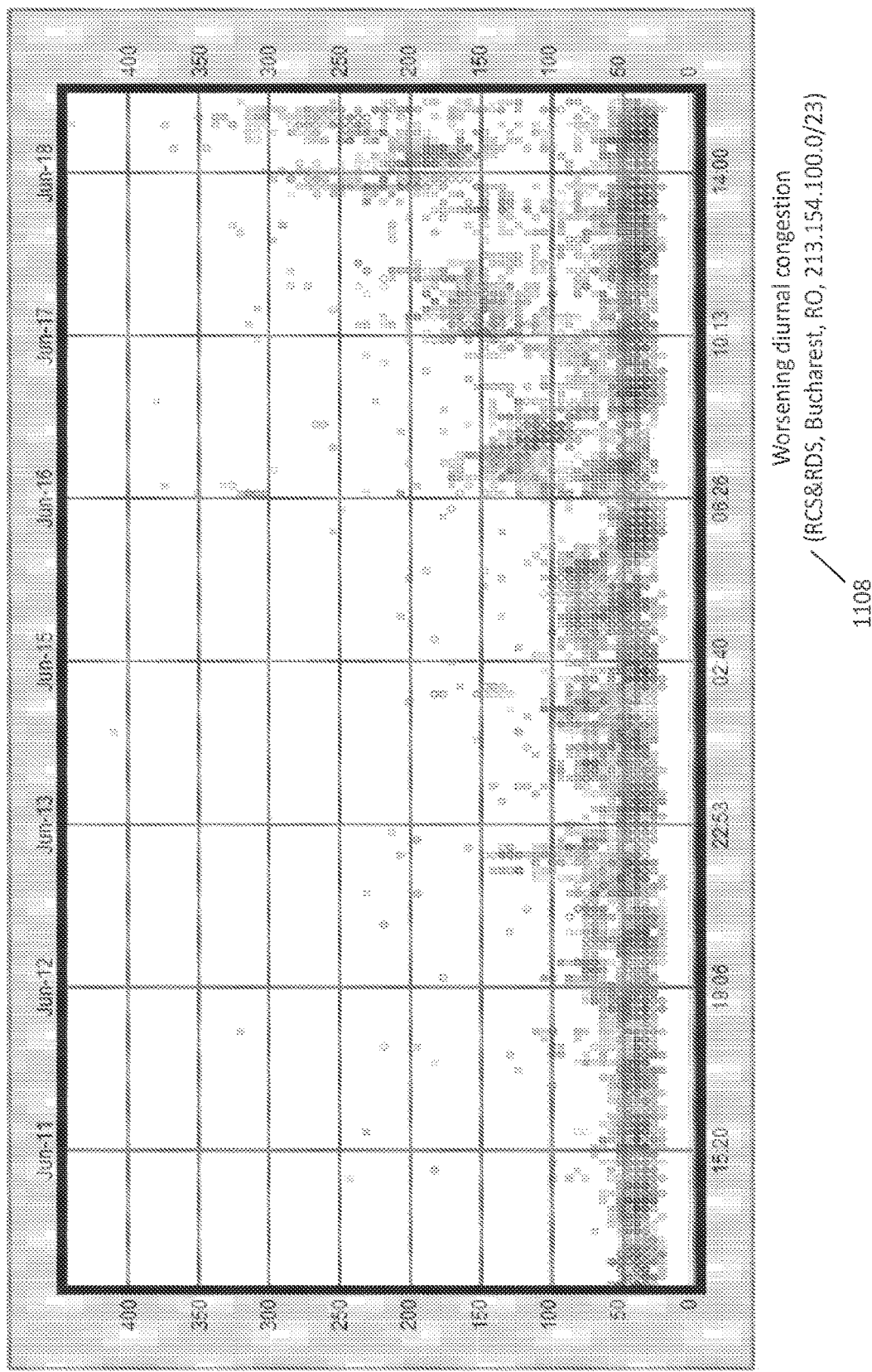
FIG. 11D is a plot of round-trip latencies as measured to IP addresses in a particular network prefix (213.154.100.0/23) controlled by RCS&RDS in Bucharest, Romania, from a set of three similar collectors.

FIG. 11D is a plot of round-trip latencies as measured to IP addresses in a particular network prefix (213.154.100.0/23) controlled by RCS&RDS in Bucharest, Romania, from a set of three similar collectors (displayed in different colors). The plot shows a consistent latency of approximately 35 ms from all three collectors. Starting on June 12, a subpopulation of the measured addresses began to exhibit a diurnal latency rise. By June 18, the subpopulation exhibits diurnal latency variation of as much as 300 ms from baseline.

The master server 110 can be trained to recognize traceroute data patterns over time by one or more artificial intelligence techniques allowing to an automatic modelling of the information transmission system and/or network 100 from the observations of the traceroute data samples. The artificial intelligence techniques can include but are not limited to timed automata, real-time automata and the like artificial intelligence techniques. Once the system 100 is modeled, the master server 110 can operate as a classifier of the traceroute data to identify a type of anomaly. Some of the anomalies that can be identified by the master server 110 can include a mode change 1102, a mode consolidation 1104, a multi-mode shift 1106, a worsening diurnal congestion 1108 and the like anomalies. Moreover, the master server can also determine the country affected by an anomaly 1110, an affected country's Regional Internet Registry 1112, a DNS identifier affected by the anomaly 1111 and/or an ISP affected by the anomaly 1109.

Performance Anomaly Alerts

Figure 12:
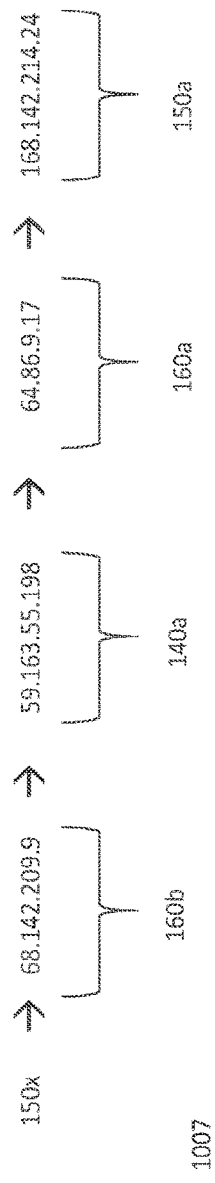
FIG. 12 illustrates an example of content comprised within an alert message generated by the alert system.

If the master server 110 recognizes a performance anomaly, e.g., by recognizing a pattern in the latency data or the comparison of current and baseline latency states, it may generate and issue an alert like the alert message 1201 shown in FIG. 12. In some instances, the master server 110 can alert one or more clients 114 about an identified anomaly. The anomaly alert can indicate a geographical area affected by the alert. For example, the alert message can indicate that the affected geographical area is Northwest Washington D.C. In addition to the geographical area, the alert message can show an affected path 1205. The affected path in this example includes the devices (140a-160a-160b-160c-140b-160d-160e) shown in FIG. 7.

Moreover, the alert message can indicate an unaffected geographical area 1003, for example, Southwest Washington D.C. In some cases, the alert message may include a suggested alternative path. For example, an alternative path can include the devices 140a-160a-160b-140c-160f-160d-

160e shown in FIG. 7. An estimated latency transmission time 1007 corresponding to the alternative path can be provided in the alert message indicating and estimated time to transmit data packets through the suggested alternative path.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments of the invention can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single computer or distributed among multiple computers.

In this respect, various aspects of the invention may be embodied at least in part as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium or non-transitory medium) encoded with one or more programs that, when executed on one or more computers or other processors, perform methods that implement the various embodiments of the technology discussed above. The computer readable medium or media can be transportable, such that the program or programs stored thereon can be loaded onto one or more different computers or other processors to implement various aspects of the present technology as discussed above.

The terms "program" or "software" are used herein in a generic sense to refer to any type of computer code or set of computer-executable instructions that can be employed to program a computer or other processor to implement various aspects of the present technology as discussed above. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A non-transitory computer readable medium comprising instructions which, when performed by one or more hardware processors, causes performance of operations comprising:
   detecting data traffic associated with a target device, the data traffic being transmitted from the target device, being transmitted to the target device, or being transmitted through the target device;
   determining a transmission frequency or an amount of data corresponding to the data traffic associated with the target device;
   based on the transmission frequency or the amount of data corresponding to the data traffic associated with the target device, selecting a collection rate for sampling the data traffic;
   sampling latency data associated with the data traffic based on the selected collection rate; and
   storing the latency data obtained by the sampling operation in a queue;
   determining a current latency associated with the data traffic using the latency data stored in the queue;
   responsive to receiving a new latency datum to be stored in the queue:
      moving an oldest latency datum in the queue to a baseline reservoir; and
      storing the new latency datum in the queue; and
   calculating a baseline latency using a set of latency data stored in the baseline reservoir.

2. The non-transitory computer readable medium of claim 1, wherein selecting the collection rate for sampling the data traffic comprises:
   responsive to detecting a first transmission frequency or a first amount of data corresponding to the data traffic: selecting a first collection rate for sampling the latency data; and
   responsive to detecting a second transmission frequency greater than the first transmission frequency, or a second amount of data greater than the first amount of data: selecting a second collection rate for sampling the latency data, the second collection rate being lower than the first collection rate.

3. The non-transitory computer readable medium of claim 1, wherein the instructions further cause performance of operations comprising:
   determining a size of the queue based on the selected collection rate.

4. The non-transitory computer readable medium of claim 3, wherein determining the size of the queue comprises:
   setting the size of the queue to a first size based on determining the selected collection rate is a first collection rate; and
   setting the size of the queue to a second size, less than the first size, based on determining the selected collection rate is a second collection rate less than the first collection rate.

5. The non-transitory computer readable medium of claim 1, wherein the instructions further cause performance of operations comprising:
   identifying a data transmission anomaly based on comparing the baseline latency to the current latency.

6. The non-transitory computer readable medium of claim 1, wherein the collection rate for sampling the data traffic is selected further based on a location of the target device in a computer network.

7. The non-transitory computer readable medium of claim 1, wherein the operations further comprise:
   responsive to moving the oldest latency datum in the queue to the baseline reservoir: replacing a random latency datum in the baseline reservoir with the oldest latency datum from the queue.

8. A method, comprising:
   detecting data traffic associated with a target device, the data traffic being transmitted from the target device, being transmitted to the target device, or being transmitted through the target device;
   determining a transmission frequency or an amount of data corresponding to the data traffic associated with the target device;
   based on the transmission frequency or the amount of data corresponding to the data traffic associated with the target device, selecting a collection rate for sampling the data traffic;
   sampling latency data associated with the data traffic based on the selected collection rate;
   storing the latency data obtained by the sampling operation in a queue;
   determining a current latency associated with the data traffic using the latency data stored in the queue;
   responsive to receiving a new latency datum to be stored in the queue:
      moving an oldest latency datum in the queue to a baseline reservoir; and
      storing the new latency datum in the queue; and
   calculating a baseline latency using a set of latency data stored in the baseline reservoir.

9. The method of claim 8, wherein selecting the collection rate for sampling the data traffic comprises:
   responsive to detecting a first transmission frequency or a first amount of data corresponding to the data traffic: selecting a first collection rate for sampling the latency data; and
   responsive to detecting a second transmission frequency greater than the first transmission frequency, or a second amount of data greater than the first amount of data: selecting a second collection rate for sampling the latency data, the second collection rate being lower than the first collection rate.

10. The method of claim 8, further comprising:
determining a size of the queue based on the selected collection rate.

11. The method of claim 10, wherein determining the size of the queue comprises:
setting the size of the queue to a first size based on determining the selected collection rate is a first collection rate; and
setting the size of the queue to a second size, less than the first size, based on determining the selected collection rate is a second collection rate less than the first collection rate.

12. The method of claim 8, further comprising:
identifying a data transmission anomaly based on comparing the baseline latency to the current latency.

13. A system, comprising:
one or more processors; and
memory storing instructions that, when executed by the one or more processors, cause the system to perform operations comprising:
detecting data traffic associated with a target device, the data traffic being transmitted from the target device, being transmitted to the target device, or being transmitted through the target device;
determining a transmission frequency or an amount of data corresponding to the data traffic associated with the target device;
based on the transmission frequency or the amount of data corresponding to the data traffic associated with the target device, selecting a collection rate for sampling the data traffic;
sampling latency data associated with the data traffic based on the selected collection rate;
storing the latency data obtained by the sampling operation in a queue;
determining a current latency associated with the data traffic using the latency data stored in the queue;
responsive to receiving a new latency datum to be stored in the queue:
moving an oldest latency datum in the queue to a baseline reservoir; and
storing the new latency datum in the queue; and
calculating a baseline latency using a set of latency data stored in the baseline reservoir.

14. The system of claim 13, wherein selecting the collection rate for sampling the data traffic comprises:
responsive to detecting a first transmission frequency or a first amount of data corresponding to the data traffic: selecting a first collection rate for sampling the latency data; and
responsive to detecting a second transmission frequency greater than the first transmission frequency, or a second amount of data greater than the first amount of data: selecting a second collection rate for sampling the latency data, the second collection rate being lower than the first collection rate.

15. The system of claim 13, wherein the instructions further cause performance of operations comprising:
determining a size of the queue based on the selected collection rate.

16. The system of claim 15, wherein determining the size of the queue comprises:
setting the size of the queue to a first size based on determining the selected collection rate is a first collection rate; and
setting the size of the queue to a second size, less than the first size, based on determining the selected collection rate is a second collection rate less than the first collection rate.

17. The system of claim 13, wherein the instructions further cause performance of operations comprising:
identifying a data transmission anomaly based on comparing the baseline latency to the current latency.

18. The system of claim 13, wherein the target device is one of a load balancer, network optimization appliance, and configuration management system.

\* \* \* \* \*